(12) United States Patent
Ishidome et al.

(10) Patent No.: US 12,533,381 B2
(45) Date of Patent: *Jan. 27, 2026

(54) ANGIOGENESIS AGENT AND METHOD OF PRODUCING EXTRACELLULAR VESICLE HAVING ANGIOGENESIS ACTION

(71) Applicant: FUJIFILM Wako Pure Chemical Corporation, Osaka (JP)

(72) Inventors: Takamasa Ishidome, Amagasaki (JP); Masayuki Yamane, Amagasaki (JP)

(73) Assignee: FUJIFILM WAKO PURE CHEMICAL CORPORATION, Osaka (JP)

( * ) Notice: Subject to any disclaimer, the term of this patent is extended or adjusted under 35 U.S.C. 154(b) by 567 days.

This patent is subject to a terminal disclaimer.

(21) Appl. No.: 17/864,633

(22) Filed: Jul. 14, 2022

(65) Prior Publication Data

US 2022/0354895 A1 Nov. 10, 2022

Related U.S. Application Data

(63) Continuation of application No. PCT/JP2021/001132, filed on Jan. 14, 2021.

(30) Foreign Application Priority Data

Jan. 15, 2020 (JP) ................................ 2020-004764

(51) Int. Cl.
A61K 35/28 (2015.01)

(52) U.S. Cl.
CPC .................................. A61K 35/28 (2013.01)

(58) Field of Classification Search
None
See application file for complete search history.

(56) References Cited

U.S. PATENT DOCUMENTS

| | | | |
|---|---|---|---|
| 5,200,471 A | 4/1993 | Coleman et al. | |
| 2012/0009594 A1* | 1/2012 | Yoneda | G01N 33/579 435/254.2 |
| 2012/0009595 A1 | 1/2012 | Lane et al. | |
| 2013/0197206 A1 | 8/2013 | Nishibu et al. | |
| 2014/0356886 A1* | 12/2014 | Yoneda | G01N 33/5308 435/320.1 |
| 2018/0120299 A1 | 5/2018 | Nishibu et al. | |
| 2020/0041391 A1 | 2/2020 | Inuzuka et al. | |
| 2020/0393449 A1 | 12/2020 | Nishibu et al. | |

FOREIGN PATENT DOCUMENTS

| | | |
|---|---|---|
| CN | 107002072 A | 8/2017 |
| CN | 109891236 A | 6/2019 |
| EP | 0 140 489 A1 | 5/1985 |
| JP | 5-41946 A | 2/1993 |
| JP | 3269554 B2 | 3/2002 |
| JP | 2016-88689 A | 5/2016 |
| KR | 10-2018-0111674 A | 10/2018 |
| KR | 10-2047768 B1 | 11/2019 |
| WO | WO 2012/039395 A1 | 3/2012 |
| WO | WO 2016/088689 A1 | 6/2016 |
| WO | WO 2018/026212 A2 | 2/2018 |
| WO | WO 2018/182356 A1 | 10/2018 |
| WO | WO 2019/217646 A1 | 11/2019 |

OTHER PUBLICATIONS

Aoki, "Adiposomes: functional membrane vesicles secreted by adipocytes," Obesity Research, vol. 13, No. 2, 2007, pp. 209-211 (6 pages total), with English translation.
Ferguson et al., "The microRNA regulatory landscape of MSC-derived exosomes: a systems view," Scientific Reports, vol. 8, No. 1419, 2018 (Published online Jan. 23, 2018) 12 pages total.
Hu et al., "Exosomes secreted by human-induced pluripotent stem cell-derived mesenchymal stem cells attenuate limb ischemia by promoting angiogenesis in mice," Stem Cell Research & Therapy, vol. 6, No. 10, 2015, pp. 1-15.
International Preliminary Report on Patentability dated Jul. 28, 2022, and English translation of the Written Opinion of the International Searching Authority for International Application No. PCT/JP2021/001132, dated Mar. 23, 2021.
International Search Report for International Application No. PCT/JP2021/001132, dated Mar. 23, 2021, with English translation.
Ma et al., "MicroRNA-132, Delivered by Mesenchymal Stem Cell-Derived Exosomes, Promote Angiogenesis in Myocardial Infarction," Stem Cells International, vol. 2018, 2018, pp. 1-11 (12 pages total).
Mathieu et al., "Specificities of secretion and uptake of exosomes and other extracellular vesicles for cell-to-cell communication," Nature Cell Biology, vol. 21, Jan. 2019, pp. 9-17.
Thery et al., "Membrane vesicles as conveyors of immune responses," Nature Reviews Immunology, vol. 9. Aug. 2009, pp. 581-593.
Extended European Search Report dated Jun. 6, 2023 for Application No. 21740755.0.
Japanese Office Action dated Jun. 6, 2023 for Application No. 2021-571239 with an English translation.
Kobayashi et al., "Effects of exosomes derived from the induced pluripotent stem cells on skin wound healing", Nagoya J. Med. Sci., vol. 80, 2018, pp. 141-153.
Liu et al., "Exosomes from adipose-derived mesenchymal stem cells prevent cardiomyocyte apoptosis induced by oxidative stress", Cell Death Discovery, vol. 5, No. 79, 2019, pp. 1-7.

(Continued)

*Primary Examiner* — Blaine Lankford
(74) *Attorney, Agent, or Firm* — Birch, Stewart, Kolasch & Birch, LLP

(57) ABSTRACT

The present invention relates to the angiogenesis agent containing a mesenchymal stem cell-derived extracellular vesicle, as an active ingredient, in which an extracellular vesicle is obtained by a method of using a substance that contains an extracellular vesicle having an affinity for phosphatidylserine, or/and an extracellular vesicle is derived from a mesenchymal stem cell stimulated with a growth factor, and relates to a method of producing an extracellular vesicle as the angiogenesis agent.

9 Claims, 8 Drawing Sheets

(56) References Cited

OTHER PUBLICATIONS

Japanese Office Action for corresponding Japanese Application No. 2021-571239, dated Dec. 12, 2023, with English translation.
U.S. Appl. No. 17/865,875, filed Jul. 15, 2022.
"MagCapture Exosome Isolation Kit PS," Fujifilm, Feb. 10, 2019, 1 page total.
Chance et al., "The effects of cell type and culture condition on the procoagulant activity of human mesenchymal stromal cell-derived extracellular vesicles," Journal of Trauma and Acute Care Surgery, vol. 81, No. 1, Supplement 1, 2019, 2 pages total.
Chinese Office Action and Search Report for Chinese Application No. 202180010028.1, dated Jun. 26, 2023, with an English translation.
Chinese Office Action for Chinese Application No. 202180010028.1, dated Jan. 17, 2024, with an English translation.
European Communication pursuant to Article 94(3) EPC for corresponding European Application No. 21 741 345.9, dated Nov. 14, 2024.
Extended European Search Report for corresponding European Application No. 21741345.9, dated Jul. 12, 2023.
Friedrich et al., "Cytokine Networks in the Pathophysiology of Inflammatory Bowel Disease," Immunity, vol. 50, 2019, pp. 992-1006.
Han et al., "Human umbilical cord mesenchymal stem cell derived exosomes encapsulated in functional peptide hydrogels promote cardiac repair," Biomaterials Science, vol. 7, 2019, pp. 2920-2933.
Inoue, "Learn about the mechanism of disease," Tokyo Welfare Pension Hospital [Department of Pathology], vol. 34, No. 3, 2013, pp. 5-7.
International Preliminary Report on Patentability and Written Opinion of the International Searching Authority (Forms PCT/IB/326, PCT/IB/373, and PCT/ISA/237) for International Application No. PCT/JP2021/001131, dated Jul. 28, 2022, with an English translation.
International Search Report (Form PCT/ISA/210) for International Application No. PCT/JP2021/001131, dated Mar. 9, 2021, with an English translation.
Japanese Office Action for Japanese Application No. 2021-571238, dated May 23, 2023, with an English translation.
Japanese Office Action for Japanese Application No. 2021-571238, dated Oct. 11, 2024, with an English translation.
Jiang et al., "Human Umbilical Cord MSC-Derived Exosomes Suppress the Development of CCl4-Induced Liver Injury through Antioxidant Effect," Stem Cells International, 2018, pp. 1-11.
Lai et al., "A potent immunomodulatory role of exosomes derived from mesenchymal stromal cells in preventing cGVHD," Journal of Hematology & Oncology, vol. 11, No. 135, 2018, pp. 1-15.
Li et al., "Blocking the 4-1 BB Pathway Ameliorates Crystalline Silica-induced Lung Inflammation and Fibrosis in Mice," Theranostics, vol. 6, No. 12, 2016, pp. 2052-2067.
Mao et al., "Exosomes Derived from Human Umbilical Cord Mesenchymal Stem Cells Relieve Inflammatory Bowel Disease in Mice," BioMed Research International, 2017, pp. 1-12.
Masahiko et al., "Discovery of a compound that induces regulatory T cells and suppresses inflammation—Elucidation of the induction control mechanism leading to the realization of treatment by induction of regulatory T cells," Kyoto University Press Release, Oct. 30, 2019, pp. 1-4, URL: <https://www.kyoto-u.ac.jp/ja/research-news/2019-10-30-0>.
Nakai et al., "A novel affinity-based method for the isolation of highly purified extracellular vesicles," Scientific Reports, vol. 6, No. 33935, 2016, 11 pages total.
Ohara et al., "Extracellular Vesicles from Amnion-Derived Mesenchymal Stem Cells Ameliorate Hepatic Inflammation and Fibrosis in Rats," Stem Cells International, vol. 2018, 2018, pp. 1-15.
Phinney et al., "Concise Review: MSC-Derived Exosomes for Cell-Free Therapy," Stem Cells, vol. 35, 2017, pp. 851-858.
Shentu et al., "Thy-1 dependent uptake of mesenchymal stem cell-derived extracellular vesicles blocks myofibroblastic differentiation," Scientific Reports, vol. 7, No. 18052, 2017, pp. 1-11.
Silachev et al., "Effect of MSCs and MSC-Derived Extracellular Vesicles on Human Blood Coagulation," Cells, vol. 8, No. 258, 2019, pp. 1-23.
Tolomeo et al., "Annexin a5(An5)-bound extracellular vesicles (EVs) from mesenchymal stromal cells (MSCs) show enhanced and specific antiinflammatory effects," Journal of Extracellular Vesicles, vol. 7, 2018, 2 pages total.
U.S. Office Action for U.S. Appl. No. 17/865,875, dated Dec. 4, 2024.
Wang et al., "A novel bacterial cellulose membrane immobilized with human umbilical cord mesenchymal stem cells-derived exosome prevents epidural fibrosis," International Journal of Nanomedicine, vol. 13, 2018, pp. 5257-5273.
Wang et al., "Enhanced efficacy of curcumin with phosphatidylserine-decorated nanoparticles in the treatment of hepatic fibrosis," Drug Delivery, vol. 25, No. 1, 2018, pp. 1-11.
Willis et al., "Mesenchymal Stromal Cell Exosomes Ameliorate Experimental Bronchopulmonary Dysplasia and Restore Lung Function through Macrophage Immunomodulation," American Journal of Respiratory and Critical Care Medicine, vol. 197, No. 1, 2018, pp. 104-116.
Written Opposition for Japanese Application No. 2021-571238, dated Oct. 4, 2024, with a partial English translation.
Wu et al., "The attenuation of renal fibrosis by histone deacetylase inhibitors is associated with the plasticity of FOXP3+IL-17+ T cells," BMC Nephrology, vol. 18, No. 225, 2017, pp. 1-12.
Yamane et al., "Purification of highly active MSC-derived exosomes realized by PS affinity method—Proposal of a completely new strategy in regenerative therapy using exosomes-," WAKO Pure Chemical News, vol. 88, No. 4, 2020, pp. 10-11.
Yamashita et al., "Possibility of Exosome-Based Therapeutics and Challenges in Production of Exosomes Eligible for Therapeutic Application," Biological and Pharmaceutical Bulletin, vol. 41, No. 6, 2018, pp. 835-842.
Zhang et al., "Exosomes originating from MSCs stimulated with TGF-β and IFN-γ promote Treg differentiation," Journal of Cellular Physiology, vol. 233, 2018, pp. 6832-6840.
Zhang et al., "Pretreatment of Cardiac Stem Cells With Exosomes Derived From Mesenchymal Stem Cells Enhances Myocardial Repair," Journal of the American Heart Association, vol. 5, 2016, pp. 1-16.
Zou et al., "Human mesenchymal stromal cell-derived extracellular vesicles alleviate renal ischemic reperfusion injury and enhance angiogenesis in rats," American Journal of Translational Research, vol. 8, No. 10, 2016, pp. 4289-4299.
U.S. Office Action for U.S. Appl. No. 17/865,875, dated Jun. 4, 2025.
European Communication pursuant to Article 94(3) EPC for corresponding European Application No. 21 740 755.0, dated Oct. 21, 2025.

\* cited by examiner

FIG. 1
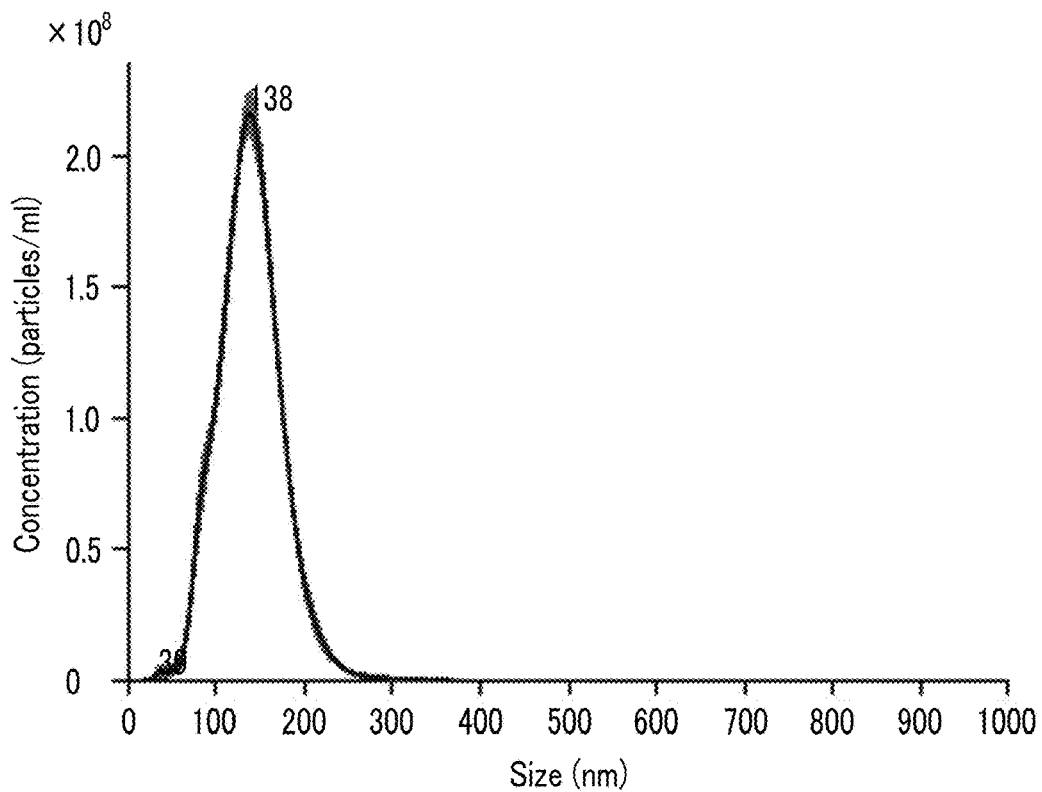
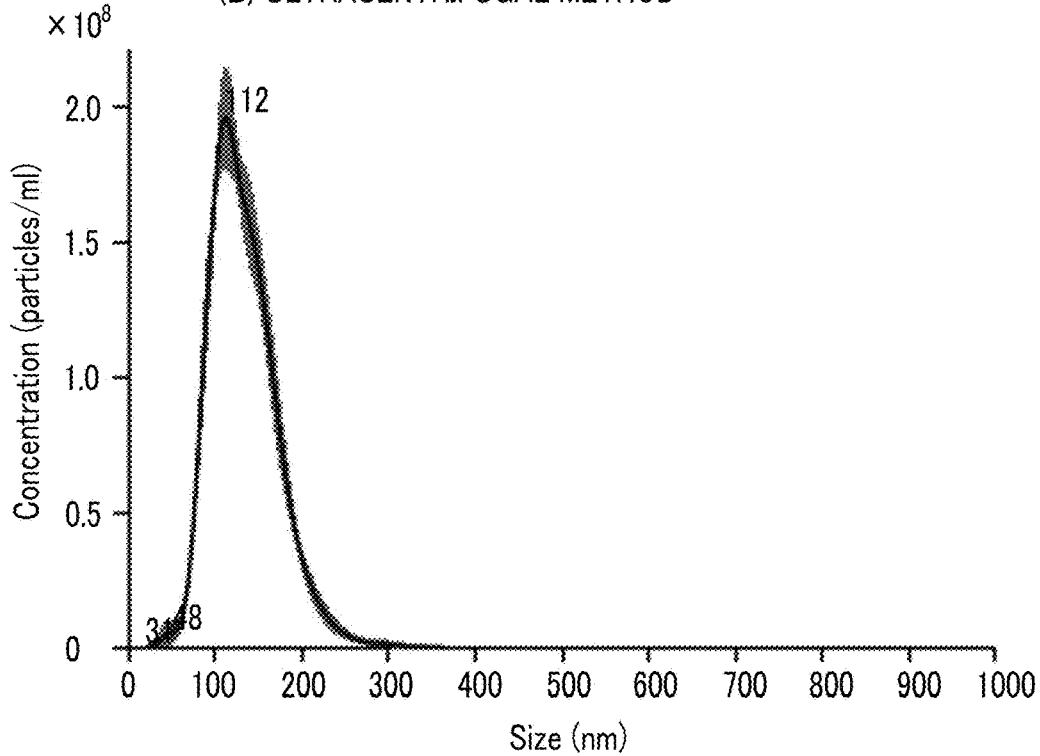

FIG. 5A

BONE MARROW-DERIVED MSC

EXTRACELLULAR
VESICLE (−)

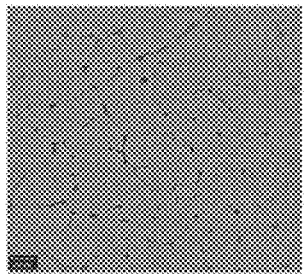

BONE MARROW MSC-DERIVED
EXTRACELLULAR VESICLE (+)
PURIFIED BY UC METHOD

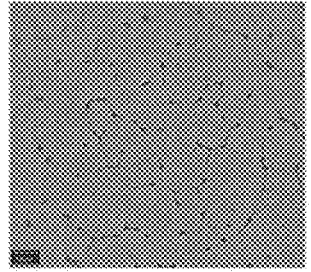

BONE MARROW MSC-DERIVED
EXTRACELLULAR VESICLE (+)
PURIFIED BY PS-AFFINITY
METHOD

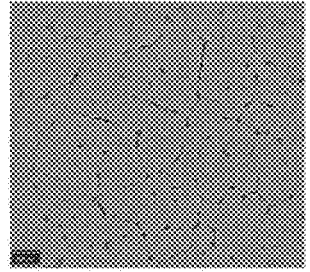

BONE MARROW MSC-DERIVED
EXTRACELLULAR VESICLE (+)
PURIFIED BY UC METHOD
(VEGF STIMULATION
IS APPLIED)

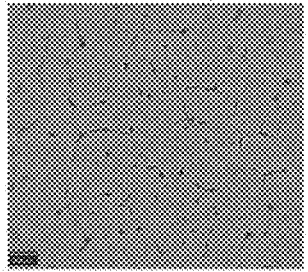

BONE MARROW MSC-DERIVED
EXTRACELLULAR VESICLE (+)
PURIFIED BY PS-AFFINITY
METHOD (VEGF STIMULATION
IS APPLIED)

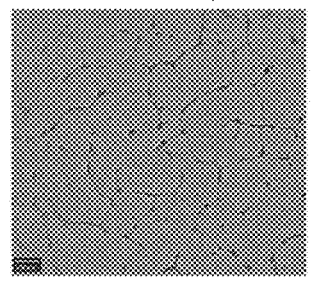

BONE MARROW MSC-DERIVED
EXTRACELLULAR VESICLE (+)
PURIFIED BY UC METHOD
(bFGF STIMULATION IS APPLIED)

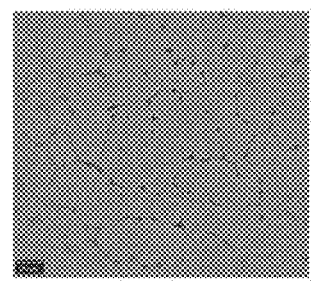

BONE MARROW MSC-DERIVED
EXTRACELLULAR VESICLE (+)
PURIFIED BY PS-AFFINITY
METHOD (bFGF STIMULATION
IS APPLIED)

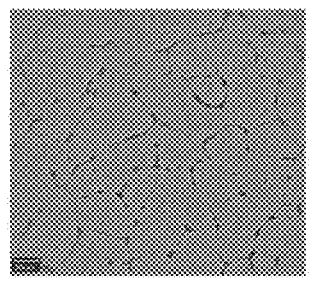

BONE MARROW MSC-DERIVED
EXTRACELLULAR VESICLE (+)
PURIFIED BY UC METHOD
(TGFβ1 STIMULATION
IS APPLIED)

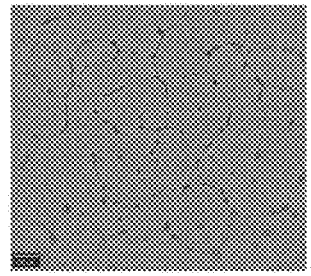

BONE MARROW MSC-DERIVED
EXTRACELLULAR VESICLE (+)
PURIFIED BY PS-AFFINITY
METHOD (TGFβ1 STIMULATION
IS APPLIED)

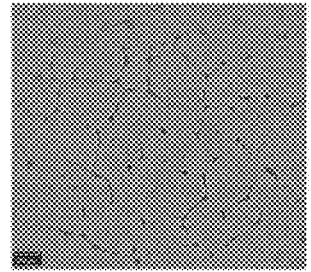

FIG. 5B

ADIPOSE-DERIVED MSC

EXTRACELLULAR
VESICLE (-)
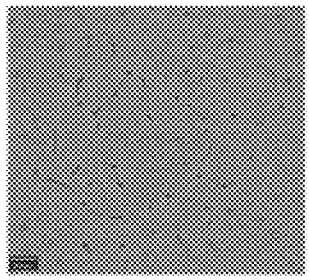

ADIPOSE MSC-DERIVED
EXTRACELLULAR VESICLE (+)
PURIFIED BY UC METHOD
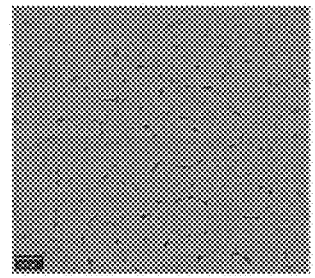

ADIPOSE MSC-DERIVED
EXTRACELLULAR VESICLE (+)
PURIFIED BY PS-AFFINITY
METHOD
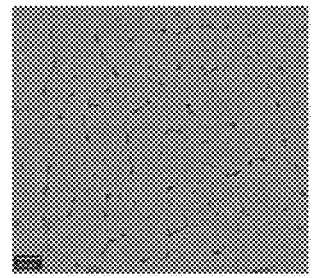

ADIPOSE MSC-DERIVED
EXTRACELLULAR VESICLE (+)
PURIFIED BY UC METHOD
(VEGF STIMULATION
IS APPLIED)
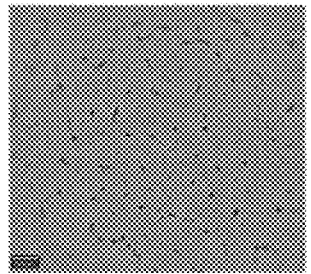

ADIPOSE MSC-DERIVED
EXTRACELLULAR VESICLE (+)
PURIFIED BY PS-AFFINITY
METHOD (VEGF STIMULATION
IS APPLIED)
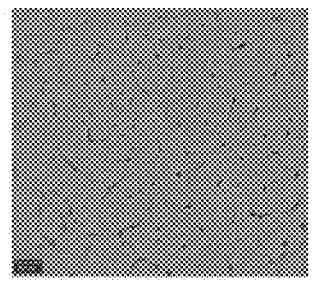

ADIPOSE MSC-DERIVED
EXTRACELLULAR VESICLE (+)
PURIFIED BY UC METHOD
(bFGF STIMULATION
IS APPLIED)
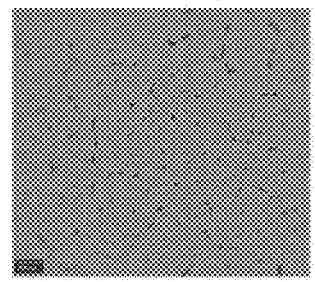

ADIPOSE MSC-DERIVED
EXTRACELLULAR VESICLE (+)
PURIFIED BY PS-AFFINITY
METHOD (bFGF STIMULATION
IS APPLIED)
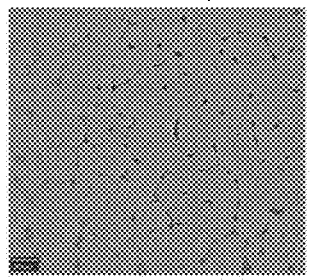

ADIPOSE MSC-DERIVED
EXTRACELLULAR VESICLE (+)
PURIFIED BY PS-AFFINITY
METHOD (TGF$\beta$3 STIMULATION
IS APPLIED)
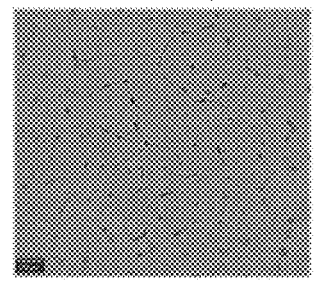

FIG. 5C

UMBILICAL CORD-DERIVED MSC

EXTRACELLULAR VESICLE (-)

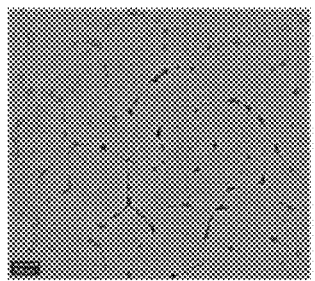

UMBILICAL CORD MSC-DERIVED EXTRACELLULAR VESICLE (+) PURIFIED BY UC METHOD

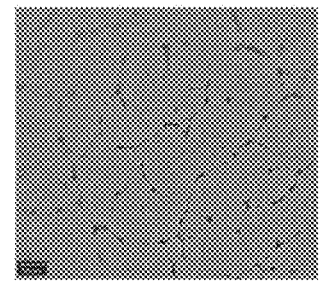

UMBILICAL CORD MSC-DERIVED EXTRACELLULAR VESICLE (+) PURIFIED BY PS-AFFINITY METHOD

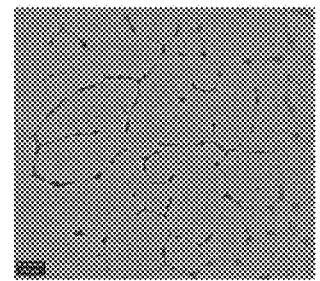

UMBILICAL CORD MSC-DERIVED EXTRACELLULAR VESICLE (+) PURIFIED BY UC METHOD (VEGF STIMULATION IS APPLIED)

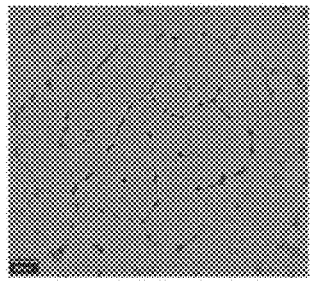

UMBILICAL CORD MSC-DERIVED EXTRACELLULAR VESICLE (+) PURIFIED BY PS-AFFINITY METHOD (VEGF STIMULATION IS APPLIED)

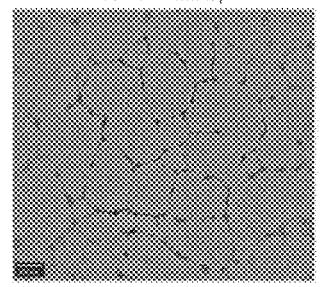

ANGIOGENESIS AGENT AND METHOD OF PRODUCING EXTRACELLULAR VESICLE HAVING ANGIOGENESIS ACTION

CROSS-REFERENCE TO RELATED APPLICATIONS

This application is a Continuation of PCT International Application No. PCT/JP2021/001132 filed on Jan. 14, 2021, which claims priority under 35 U.S.C § 119(a) to Japanese Patent Application No. 2020-004764 filed on Jan. 15, 2020. Each of the above application(s) is hereby expressly incorporated by reference, in its entirety, into the present application.

BACKGROUND OF THE INVENTION

1. Field of the Invention

The present invention relates to an angiogenesis agent composed of mesenchymal stem cell-derived extracellular vesicles.

2. Description of the Related Art

It is considered that extracellular vesicles that are derived from cells and are small membrane vesicles composed of lipid bilayers are responsible for intercellular communication through the transfer of nucleic acids such as mRNA and microRNA contained, or proteins (Mathieu M, Martin-Jaular L, Lavieu G, Thery C (2019) Specificities of secretion and uptake of exosomes and other extracellular vesicles for cell-to-cell communication. Nat Cell Biol, 21(1): 9-17).

Mesenchymal stem cells (hereinafter may be abbreviated as "MSCs") are somatic stem cells derived from mesoderm tissue. MSCs can be separated from adipose, bone marrow, umbilical cord matrix, or the like, all of which are believed to have in common the ability to adhesiveness, CD105, CD73, CD90 positive, CD45, CD34, CD14, CD11b, CD79a, CD19, HLA-Class II (DR)negative, differentiation potential into bone, adipose, and cartilage.

In recent years, it has been suggested that extracellular vesicles may be involved in various diseases. In addition, it has been reported that extracellular vesicles acquired from mesenchymal stem cell-derived extracellular vesicles by an ultracentrifugal method have an angiogenesis action (angiogenesis effect) (Ferguson et al. (2018) The microRNA regulatory landscape of MSC-derived exosomes: a systems view. Sci Rep, 8(1):1419).

SUMMARY OF THE INVENTION

The present inventors have examined the angiogenesis action of extracellular vesicles acquired from mesenchymal stem cell-derived extracellular vesicles by the ultracentrifugal method, and have found that the action was weak and insufficient for industrial use. In view of the above circumstance, an object of the present invention is to provide a therapeutic preparation composed of a population of extracellular vesicles having a higher therapeutic effect, particularly to provide an angiogenesis agent.

In order to solve the above problems, the present inventors have diligently studied extracellular vesicles selectively recovered by various methods of acquiring extracellular vesicles. As a result, the present inventors have found that a population of extracellular vesicles having a feature such as PS positivity, which is acquired by a method of using a substance having an affinity for phosphatidylserine (PS) (PS-affinity method), or/and a population of mesenchymal stem cell-derived extracellular vesicles stimulated with a growth factor is highly effective as an angiogenesis agent, and have completed the present invention.

That is, a basic aspect of the present invention includes:

(1) an angiogenesis agent comprising a mesenchymal stem cell-derived extracellular vesicle, as an active ingredient, in which an extracellular vesicle is obtained by a method of using a substance that contains an extracellular vesicle having an affinity for phosphatidylserine, or/and an extracellular vesicle is derived from a mesenchymal stem cell stimulated with a growth factor;

(2) the angiogenesis agent according to (1), in which the mesenchymal stem cell is a cell derived from an iPS cell or a cell derived from one or more tissues selected from the group consisting of umbilical cord, umbilical cord blood, bone marrow, adipose, muscle, nerve, skin, amniotic membrane, and placenta;

(3) the angiogenesis agent according to (1) or (2), in which the mesenchymal stem cell is stimulated with the growth factor;

(4) the angiogenesis agent according to any one of (1) to (3), in which the extracellular vesicle is obtained by a method of using a substance having an affinity for phosphatidylserinae;

(5) the angiogenesis agent according to (4) above, in which the substance having an affinity for phosphatidylserine is a Tim protein;

(6) the angiogenesis agent according to (5), in which the Tim protein is selected from Tim4 protein, Tim3 protein, and Tim1 protein;

(7) the angiogenesis agent according to (1) or (2), in which the extracellular vesicle is derived from a mesenchymal stem cell stimulated with a growth factor, and is obtained by a method of using a substance having an affinity for phosphatidylserine;

(7-2) the angiogenesis agent according to any one of (1) to (7), in which the growth factor is one or more growth factors selected from the group consisting of vascular endothelial cell growth factor, transforming growth factor β, and basic fibroblast growth factor.

The present invention is also a method of producing an extracellular vesicle as the angiogenesis agent, and specifically includes:

(8) a method of producing an extracellular vesicle having an angiogenesis action, the method comprising a step of obtaining an extracellular vesicle from a mesenchymal stem cell-derived extracellular vesicle by a method of using a substance having an affinity for phosphatidylserine, or/and a step of obtaining a mesenchymal stem cell-derived extracellular vesicle stimulated with a growth factor;

(9) the method of producing an extracellular vesicle according to (8), the method comprising a step of obtaining an extracellular vesicle from a mesenchymal stem cell-derived extracellular vesicle by a method of using a substance having an affinity for phosphatidylserine;

(10) the method of producing an extracellular vesicle according to (8) or (9), in which the substance having an affinity for phosphatidylserine is a Tim protein;

(11) the method of producing an extracellular vesicle according to (10), in which the Tim protein is selected from Tim4 protein, Tim3 protein, and Tim1 protein;

(12) the method of producing an extracellular vesicle according to any one of (8) to (11), the method further comprising a step of obtaining a mesenchymal stem cell-derived extracellular vesicle stimulated with a growth factor;

(12-2) the angiogenesis agent according to any one of (8) to (12), in which the growth factor is one or more growth factors selected from the group consisting of vascular endothelial cell growth factor, transforming growth factor β, and basic fibroblast growth factor.

The present invention is to provide the angiogenesis agent containing an extracellular vesicle that has an angiogenesis action and that is obtained from a mesenchymal stem cell, as an active ingredient. According to the angiogenesis agent of the aspect of the present invention, since angiogenesis is induced, it is possible to regenerate functions of the living tissues and the organs that have fallen into functional disorder or that have become dysfunctional.

BRIEF DESCRIPTION OF THE DRAWINGS

FIG. 1 is a diagram illustrating a result of analysis of a particle size distribution of MSC-derived extracellular vesicles acquired by a PS-affinity method and an ultracentrifugation method by a nanoparticle tracking analysis (NTA) method.

FIG. 5A is an image of cells illustrating the results of evaluating an angiogenesis action of bone marrow MSC-derived extracellular vesicles based on tube formation in HUVEC cells as an index.

FIG. 5B is an image of cells illustrating the results of evaluating an angiogenesis action of adipose MSC-derived extracellular vesicles based on tube formation in HUVEC cells as an index.

FIG. 5C is an image of cells illustrating the results of evaluating an angiogenesis action of umbilical cord MSC-derived extracellular vesicles based on tube formation in HUVEC cells as an index.

DESCRIPTION OF THE PREFERRED EMBODIMENTS

Figure 2:
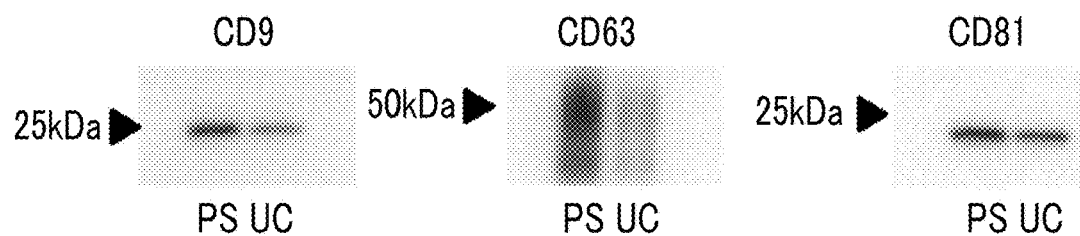
FIG. 2 is a diagram illustrating results of detecting CD9, CD63, and CD81 of MSC-derived extracellular vesicles acquired by the PS-affinity method and the ultracentrifugation method by a Western blotting method.

As described above, a basic aspect of the present invention includes an angiogenesis agent containing an extracellular vesicle that is obtained by a method in which a substance having an affinity for phosphatidylserine obtained from a mesenchymal stem cell-derived extracellular vesicle is used or/and a mesenchymal stem cell-derived extracellular vesicle stimulated with a growth factor, as an active ingredient An extracellular vesicle (hereinafter, may be abbreviated as "EV") is a small membrane vesicle derived from a cell and composed of a lipid bilayer. The extracellular vesicle usually has a diameter of 20 nm to 1000 nm, preferably 50 nm to 800 nm, more preferably 50 nm to 500 nm, and particularly preferably 50 nm to 200 nm. Examples of the extracellular vesicle include extracellular vesicles included in various classifications according to the origin of their occurrence, the size of small membrane vesicles, and the like as described in Nature Reviews Immunology 9,581-593 (August 2009), "Obesity Research" Vol. 13, No. 2, 2007, Topics Naoto Aoki and others. Specific examples thereof include exosomes, microvesicles, ectosomes, membrane particles, exosome-like vesicles, apoptotic vesicles, adiposomes, and the like, exosomes and microvesicles are preferable, and exosomes are more preferable.

The exosomes are cell-derived small membrane vesicles composed of lipid bilayers, and for example, each exosome has a diameter of 50 nm to 200 nm, preferably has a diameter of 50 nm to 150 nm, and more preferably has a diameter of 50 nm to 100 nm. The exosomes are believed to be derived from late endosomes.

The microvesicles are cell-derived small membrane vesicles composed of lipid bilayers, and for example, each microvesicle has a diameter of 100 nm to 1000 nm, preferably has a diameter of 100 nm to 800 nm, and more preferably has a diameter of 100 nm to 500 nm. The microvesicles are believed to be derived from cell membranes.

The MSCs are stem cells having differentiation potential into cells belonging to (mesenchymal) tissues derived from mesoderm such as osteoblasts, adipocytes, muscle cells, and chondrocytes. The MSCs can be separated from adipose, bone marrow, umbilical cord matrix, or the like, and the MSCs used in the present invention (hereinafter, may be abbreviated as "the MSCs according to the present invention") can be obtained by, for example, a method of separating MSCs from tissues derived from mesoderm or a method of inducing MSCs from stem cells such as iPS cells and ES cells. As the MSCs according to the present invention, cells derived from one or more tissues selected from the group consisting of umbilical cord, umbilical cord blood, bone marrow, adipose, muscle, nerve, skin, amniotic membrane, and placenta or cells derived from iPS cells are preferably used. Pretreatments such as recovery, concentration, purification, isolation, dilution with a buffer solution, and filtration sterilization may be performed on the MSCs according to the present invention. These pretreatments may be appropriately performed according to conventional methods. The MSCs according to the present invention are preferably stimulated with a growth factor such as vascular endothelial cell growth factor (VEGF), transforming growth factor β (for example, TGFβ1 and TGFβ3), and basic fibroblast growth factor (bFGF), and more preferably stimulated with vascular endothelial cell growth factor and basic fibroblast growth factor.

The extracellular vesicles (hereinafter, may be abbreviated as the "extracellular vesicles according to the present invention") in the angiogenesis agent, which are provided in the present invention as an active ingredient, are extracellular vesicles (hereinafter, may be abbreviated as the "PS-positive extracellular vesicles") acquired by isolation from MSC-derived extracellular vesicles according to the present invention by using a substance having an affinity for phosphatidylserine, or/and extracellular vesicles (hereinafter, may be abbreviated as the "stimulated MSC-derived extracellular vesicles") derived from MSCs according to the present invention, stimulated with a growth factor.

The PS-positive extracellular vesicles are PS-positive (PS-containing) extracellular vesicles in which phosphatidylserine on a membrane surface of an extracellular vesicle is considered to be exposed.

As the substance having an affinity for phosphatidylserine (hereinafter, may be abbreviated as a "PS-affinity substance"), any substance may be employed as long as it can be specifically bonded to phosphatidylserine composing a membrane of an extracellular vesicle. Examples thereof include Annexin V; MFG-E8; Tim proteins such as Tim1 (T cell immunoglobulin mucin domain-containing molecule 1, T-cell immunoglobulin-mucin-domain 1) protein, Tim2 (T cell immunoglobulinmucin domain-containing molecule 2, T-cell immunoglobulin-mucin-domain 2) protein, Tim3 (T cell immunoglobulin mucin domain-containing molecule 3, T-cell immunoglobulin-mucin-domain 3) protein, and Tim4 (T cell immunoglobulin mucin domain-containing molecule 4, T-cell immunoglobulin-mucin-domain 4) protein, and from the viewpoint that extracellular vesicles can be efficiently acquired, Tim proteins are preferable, it is more preferable to be selected from Tim4 protein, Tim3 protein, and Tim1 protein, Tim4 protein and Tim1 protein are still more preferable, and Tim4 protein is particularly preferable.

The PS-positive extracellular vesicles are obtained by isolation from a cell culture supernatant liquid of the MSCs according to the present invention, which contains EV (hereinafter, may be abbreviated as a "cell culture supernatant liquid containing EV") using a substance having an affinity for phosphatidylserine, or by acquiring EV from a cell culture supernatant liquid of the MSCs according to the present invention, which contains EV, by a conventional method such as an ultracentrifugal method in this field, and isolating the PS-positive extracellular vesicles using a substance having an affinity for phosphatidylserine from the obtained EV. Among these, it is preferable to directly isolate extracellular vesicles from the cell culture supernatant liquid of the MSCs according to the present invention, which contains EV, using a substance having an affinity for phosphatidylserine. The MSCs according to the present invention are proliferated by cell culture, and the proliferated cells are further cultured in an EV production culture medium to obtain the cell culture supernatant liquid containing EV. The MSC cell culture according to the present invention and the culture in the EV production culture medium may be carried out according to a conventional method carried out in this field, and the medium and culture conditions used are not particularly limited.

The outline of a method of acquiring extracellular vesicles by the method in which a substance having an affinity for phosphatidylserine (hereinafter, may be abbreviated as a "PS-affinity method") is used is described below. As the PS-affinity method, for example, a specific example is described in WO2016/088689A.

The PS-affinity method including brining the cell culture supernatant liquid containing EV into contact with a PS-affinity substance in the presence of calcium ions, forming a composite body (hereinafter, may be abbreviated as the "composite body according to the present invention") by combining the extracellular vesicles in the cell culture supernatant liquid with the PS-affinity substance, and separating the PS-affinity substance from the composite body to acquire PS-positive extracellular vesicles.

Specifically, a preferable method as the PS-affinity method includes following steps:
(1) a step of brining the cell culture supernatant liquid containing EV into contact with a PS-affinity substance in the presence of calcium ions, forming a composite body (the composite body according to the present invention) by combining the PS-positive extracellular vesicles in the cell culture supernatant liquid with the PS-affinity substance (hereinafter, may be abbreviated as the "composite body formation step");
(2) a step of separating the composite body according to the present invention obtained in the composite body formation step from the cell culture supernatant liquid containing EV (hereinafter, may be abbreviated as the "composite body separation step");
(3) a step of acquiring PS-positive extracellular vesicles by separation of the PS-positive extracellular vesicles from the composite body according to the present invention (hereinafter, may be abbreviated as the "acquisition step").

The cell culture supernatant liquid containing EV and the PS-affinity substance in the PS-affinity method are the same as those described above, and preferred and specific examples are also the same.

The PS-affinity substance used in the composite body formation step is preferably a substance immobilized (bonded) to an insoluble carrier. In this case, the composite body according to the present invention can be separated from the cell culture supernatant liquid containing EV by a known B/F separation method in the composite body separation step.

An example of a method of immobilizing a PS-affinity substance on an insoluble carrier will be described below, and a composite body can be obtained by, for example, a method described in WO2016/088689A.

Examples of the insoluble carrier for immobilizing the PS-affinity substance include an insoluble carrier used in an immunoassay method. Specific examples thereof include organic substances such as polystyrene, polyacrylic acid, polymethacrylic acid, polymethyl methacrylate, polyacrylamide, polyglycidylmethacrylate, polypropylene, polyolefin, polyimide, polyurethane, polyester, polyvinyl chloride, polyethylene, polychlorocarbonate, a silicone resin, silicone rubber, agarose, dextran, and ethylene-maleic anhydride copolymer; inorganic substances such as glass, silicon oxide, silicon, porous glass, ground glass, alumina, silica gel, and metal oxides; magnetic materials such as iron, cobalt, nickel, magnetite, and chromite; and substances prepared from alloys of these magnetic materials. Examples of the usage form of these carriers include particles (beads), microplates, tubes, disc-shaped pieces, and the like. The form of the insoluble carriers is preferably particles (beads), and the size of each of the particles is not particularly limited, but for example, those have a size of 10 nm to 100 μm, and those preferably have a size of 100 nm to 10 μm.

Examples of a method of bonding the PS-affinity substance to the insoluble carrier include a method known per se for bonding a protein to a carrier. Examples of the method include a bonding method by affinity bonding, a bonding method by chemical bonding (for example, methods described in JP3269554B, WO2012/039395A), a bonding method by physical adsorption (for example, a method described in JP1993-41946B (JP-H05-41946)), or the like, the bonding method by physical adsorption and the bonding method by affinity bonding are preferable, and from the viewpoint of facilitation, the bonding method by physical adsorption is more preferable.

As a method of bonding the PS-affinity substance to the insoluble carrier by physical adsorption, the PS-affinity substance and the insoluble carrier are brought into contact with each other under a condition in which the PS-affinity substance and the insoluble carrier are bound, according to a method known per se.

The amount of the PS-affinity substance to be bonded to the insoluble carrier may be, for example, 0.1 µg to 50 µg, is preferably 0.1 µg to 30 µg, and is more preferably 0.1 µg to 20 µg, with respect to 1 mg of the insoluble carrier in a case where the insoluble carrier is the form of particles (beads), for example.

The physical adsorption of the PS-affinity substance and the insoluble carrier may be carried out, for example, by bringing a solution containing the PS-affinity substance into contact with the insoluble carrier.

In the solution containing the PS-affinity substance, a solution for dissolving the PS-affinity substance may be any solution as long as being capable of dissolving the PS-affinity substance in a stable state, and examples thereof include purified water, a buffer solution having a buffering action at pH 6.0 to 9.8, preferably 7.0 to 9.6 (for example, a Good's buffer solution, such as MOPS, or the like, a carbonate buffer solution, PBS, TBS, TBS-T, HBS or the like). The buffer agent concentration in these buffer solutions may be appropriately selected from a range of usually 5 to 100 mM, and preferably 10 to 100 mM. In a case where NaCl is added, the NaCl concentration is, for example, 100 to 200 mM, and is preferably 140 to 160 mM. Saccharides, salts such as NaCl, surfactants such as Tween (trademark) 20, preservatives, proteins, or the like may be contained in the solution containing the PS-affinity substance, as long as an amount thereof does not inhibit the bonding of the PS-affinity substance and the insoluble carrier.

Specific examples of the method of bonding the PS-affinity substance to the insoluble carrier by physical adsorption include the following methods. For example, 1 mg of a bead (particle) carrier and the solution containing the PS-affinity substance of 0.1 µg to 50 µg, preferably 0.1 µg to 30 µg, more preferably 0.1 µg to 20 µg are brought into contact with each other, and reacted with each other at 2° C. to 37° C., preferably 4° C. to 11° C. for 0.5 to 48 hours, preferably 0.5 to 24 hours.

The insoluble carrier to which the PS-affinity substance obtained as described above is immobilized may be subjected to a blocking treatment usually performed in this field.

The composite body formation step is carried out in the presence of calcium ions. Calcium ions are present in a case where the PS-affinity substance is brought into contact with the PS-positive extracellular vesicles in the cell culture supernatant liquid containing EV. The concentration of calcium ions in a case where the PS-affinity substance is brought into contact with the PS-positive extracellular vesicles in the cell culture supernatant liquid containing EV is usually 0.5 mM to 100 mM, preferably 1.0 mM to 10 mM, and more preferably 2.0 mM to 5.0 mM. The above described concentration of calcium ions is required in the solution containing the composite body according to the present invention until the composite body according to the present invention is formed by bringing the PS-affinity substance into contact with the PS-positive extracellular vesicles in the cell culture supernatant liquid containing EV and the composite body separation step is carried out, that is, until the step of separating the composite body according to the present invention is carried out.

What the calcium ions are derived from is not particularly limited, and examples thereof include calcium chloride, calcium hydroxide, calcium hydrogencarbonate, calcium iodide, calcium bromide, and calcium acetate, calcium chloride, calcium hydrogencarbonate, and calcium iodide are preferable, and calcium chloride and calcium hydrogencarbonate are more preferable.

As a method of allowing calcium ions to be present in a case where the PS-affinity substance is brought into contact with the PS-positive extracellular vesicles in the cell culture supernatant liquid containing EV, the calcium ion as described above may be contained in the cell culture supernatant liquid containing EV or/and the solution containing the PS-affinity substance so that the concentration of calcium ions in a case where the PS-affinity substance is brought into contact with the PS-positive extracellular vesicles in the cell culture supernatant liquid containing EV is in the above described range. In addition, a solution containing the amount of calcium ions in which the concentration of calcium ions in a case where the PS-affinity substance is brought into contact with the PS-positive extracellular vesicles in the cell culture supernatant liquid containing EV is in the above described range (hereinafter, may be abbreviated as the "calcium ion-containing solution"), the cell culture supernatant liquid containing EV, and the solution containing the PS-affinity substance may be mixed with each other.

In the calcium ion-containing solution according to the present invention, a solution for dissolving calcium ions may be any solution that does not inhibit bonding of the PS-positive extracellular vesicles and the PS-affinity substance, and examples thereof include water and a buffer solution having a buffering action at pH 7.0 to pH 8.0, and a buffer solution having a buffering action at pH 7.2 to pH 7.6 (for example, TBS, HBS, or the like) is preferable. A phosphate buffer is not preferable since the phosphate buffer and calcium are bonded to cause precipitation. The buffer agent concentration in these buffer solutions is appropriately selected from a range of usually 5 mM to 50 mM, and preferably 10 mM to 30 mM. In a case where NaCl is added, the NaCl concentration is usually selected from the range of 100 mM to 200 mM, and appropriately selected from the range of 140 mM to 160 mM.

For example, saccharides, salts such as NaCl, surfactants, preservatives, proteins such as BSA, or the like may be contained in the calcium ion-containing solution according to the present invention as long as an amount thereof does not inhibit the bonding of the PS-positive extracellular vesicles and the PS-affinity substance. Examples of the surfactants include Tween (trademark) 20 and the like, and the concentration of a surfactant in the calcium ion-containing solution according to the present invention is usually 0.00001% to 0.2%, and preferably usually 0.0005% to 0.1%.

In the composite body formation step, the amount of the cell culture supernatant liquid containing EV to be brought into contact with 1 µg of the PS-affinity substance (that may be immobilized on the insoluble carrier) is usually 0.1 ml to 100 ml, preferably 0.1 ml to 10 ml, and more preferably 0.1 ml to 1.0 ml. The temperature at which the cell culture supernatant liquid containing EV is brought into contact with the PS-affinity substance is usually 2° C. to 37° C., preferably 4° C. to 37° C., and more preferably 4° C. to 30° C. The time when the cell culture supernatant liquid containing EV is being brought into contact with the PS-affinity substance is usually 0.5 to 24 hours, preferably 0.5 to 8 hours, and more preferably 0.5 to 4 hours.

In a case where the insoluble carrier on which the PS-affinity substance is immobilized is used in the composite body formation step, the amount of the carriers is usually 0.1 mg to 20 mg per 1 mL of a solution for forming the composite body according to the present invention, preferably 0.3 mg to 10 mg, and more preferably 0.5 mg to 6.0 mg.

The composite body formation step may be performed by, for example, the following method. That is, the insoluble carriers on which the PS-affinity substance is immobilized in an amount of usually 0.1 mg to 20 mg, preferably 0.3 mg to 10 mg, and more preferably 0.5 mg to 6.0 mg per 1 mL of a solution after the cell culture supernatant liquid containing EV, the insoluble carriers on which the PS-affinity substance is immobilized, and the calcium ion-containing solution according to the present invention are mixed with each other, the calcium ion-containing solution according to the present invention in an amount such that the calcium ion concentration in a solution after the cell culture supernatant liquid containing EV, the carriers, and the calcium ion-containing solution are mixed with each other is usually 0.5 mM to 100 mM, preferably 1.0 mM to 10 mM, and more preferably 2.0 mM to 5.0 mM, and the cell culture supernatant liquid containing EV in an amount of usually 0.1 ml to 100 ml, preferably 0.1 ml to 10 ml, and more preferably 0.1 ml to 1.0 ml per 1 mg of the insoluble carrier on which the PS-affinity substance is immobilized are brought into contact with each other at usually 4.0° C. to 37° C., preferably 4.0° C. to 25° C., and more preferably 4.0° C. to 11° C. for usually 0.5 to 24 hours, preferably 0.5 to 8.0 hours, and more preferably 0.5 to 4.0 hours, to form a composite body composed of the PS-affinity substance bonded to the carrier and the PS-positive extracellular vesicle in the cell culture supernatant liquid containing EV (composite body according to the present invention).

The composite body separation step may be any method as long as the composite body according to the present invention and the cell culture supernatant liquid containing EV can be separated from each other to obtain the composite body according to the present invention, and examples thereof include the following methods.

(1) In a case where in an insoluble carrier on which a PS-affinity substance is immobilized, the carrier is a magnetic carrier: a method of installing a container that contains the composite body according to the present invention obtained in the composite body formation step on a magnet stand, as necessary, aggregating the composite body according to the present invention on a tube wall by using magnetic force, and removing supernatant to separate the composite body from the cell culture supernatant liquid containing EV.

(2) In a case where in an insoluble carrier on which a PS-affinity substance is immobilized, the carrier in the form of a bead: a method of centrifuging a container that contains the composite body according to the present invention obtained in the composite body formation step, aggregating the composite body according to the present invention by precipitation, and removing supernatant to separate the composite body from the cell culture supernatant liquid containing EV.

(3) A method of separating the composite body according to the present invention from the cell culture supernatant liquid containing EV by filtration.

Specific examples of the composite body separation step include the following method: in a case where a magnetic carrier is used as an insoluble carrier, a method of installing a container that has been subjected to the composite body formation step on a magnet stand, as necessary, aggregating the obtained composite body according to the present invention on a tube wall by using magnetic force, and removing a supernatant specimen.

After the composite body separation step, as necessary, the obtained composite body according to the present invention may be washed with a calcium ion-containing washing solution (hereinafter, may be abbreviated as a "washing operation"). By the washing operation, impurities in a biological specimen such as cell-derived components adhering to a surface of the insoluble carrier on which the PS-affinity substance is immobilized can be removed. As a washing method, other than a calcium ion-containing washing solution being used, a washing method usually used in this field can be used.

The calcium ion-containing washing solution used in the washing operation may be any solution as long as the solution contains calcium ions of usually 0.5 to 100 mM, preferably 1 to 10 mM, more preferably 2 mM to 5 mM, and does not affect the bonding of the PS-positive extracellular vesicles and the PS-affinity substance immobilized on an insoluble carrier, and examples thereof include a buffer solution (for example, TBS, TBS-T, and HBS) that contains calcium ions of usually 0.5 mM to 100 mM, preferably usually 1 mM to 10 mM, more preferably usually 2 mM to 5 mM, that has a buffering action at pH 7.0 to pH 8.0, preferably at pH 7.2 to pH 7.6, and that does not precipitate calcium. A phosphate buffer is not preferable since the phosphate buffer and calcium are bonded to cause precipitation. A buffer agent concentration in these buffer solutions is usually appropriately selected from the range of 5 mM to 50 mM, preferably 10 mM to 30 mM, and the concentration in a case of containing NaCl is usually appropriately selected from the range of 100 mM to 200 mM, and preferably 140 mM to 160 mM. Saccharides, salts such as NaCl, surfactants, preservatives, proteins such as BSA, or the like may be contained in this solution as long as an amount thereof does not inhibit the bonding of the PS-positive extracellular vesicles and the PS-affinity substance immobilized on the insoluble carrier. Examples of the surfactants include Tween (trademark) 20 (FUJIFILM Wako Pure Chemical Corporation) and the like, and a concentration of a surfactant in the washing solution is usually 0.00001% to 0.2%, and preferably usually 0.0005% to 0.1%.

A specific example of the washing operation will be described as an example of a washing operation using magnetic particles as an insoluble carrier for immobilizing the PS-affinity substance. That is, the calcium ion-containing washing solution according to the present invention is added to the container containing the composite body according to the present invention obtained in the composite body separation step, and the mixture is stirred. Thereafter, the container is installed on a magnet stand, the composite body according to the present invention is aggregated on the tube wall using magnetic force, and the solution in the container is discarded. These washing operations may be repeated several times as needed.

The acquisition step may be any method as long as the PS-positive extracellular vesicles can be acquired from the composite body according to the present invention, and a method by which the calcium ion concentration is reduced is preferable. Examples of the method by which the calcium ion concentration is reduced include a method of using a calcium ion chelating agent. That is, after the composite body separation step, and as necessary, after the washing operation, the PS-positive extracellular vesicles may be separated from the composite body according to the present invention by the calcium ion chelating agent acting on calcium ions (calcium ions bonded to the composite body according to the present invention and calcium ions introduced from the solution containing the composite body according to the present invention) to chelate calcium ions in a reaction system to reduce an effective concentration of the calcium ions in the reaction system.

The calcium ion chelating agent used in this method may be any compound capable of chelating calcium ions, and examples thereof include ethylenediaminetetraacetic acid (EDTA), nitrilotriacetic acid (NTA), diethylenetriaminepentaacetic acid (DTPA), L-glutamic acid diacetic acid (GLDA), hydroxyethylethylenediaminetriacetic acid (HEDTA), ethylene glycol bis(β-aminoethyl ether)-N,N,N,N-tetraacetic acid (GEDTA), triethylenetetramine-N,N,N',N'',N''',N'''-hexacetic acid (TTHA), 2-hydroxyethyliminodiacetic acid (HIDA), N,N-bis(2-hydroxyethyl)glycine (DHEG), trans-1z,2-diaminocyclohexane-N,N,N',N'-tetraacetic acid, monohydrate (CyDTA), and EDTA, GEDTA, CyDTA are preferable.

The calcium ion chelating agent is usually used as a solution. A solution for dissolving the calcium ion chelating agent may be any solution as long as the solution dissolves the calcium ion chelating agent, and examples thereof include purified water, a buffer solution, and the like. As the buffer solution, a buffer solution having a buffering action usually at pH 7.0 to pH 8.0, and preferably pH 7.2 to pH 7.6 (for example, PBS, TBS, HBS, or the like) is preferable. A buffer agent concentration in these buffer solutions is usually appropriately selected from the range of 5 mM to 50 mM, preferably 10 mM to 30 mM, and the concentration in a case of containing NaCl is usually appropriately selected from the range of 100 mM to 200 mM, and preferably 140 mM to 160 mM. The solution containing a calcium ion chelating agent (hereinafter, may be abbreviated as "calcium ion chelating agent-containing solution") may contain, for example, saccharides, salts such as NaCl, preservatives, proteins, and the like.

The concentration of the calcium ion chelating agent in the calcium ion chelating agent-containing solution is usually 0.5 mM to 500 mM, preferably 0.5 mM to 100 mM, and more preferably 0.5 mM to 50 mM. The pH of the calcium ion chelating agent-containing solution is usually pH 6.0 to pH 9.0, preferably pH 7.0 to pH 8.0, and more preferably pH 7.2 to pH 7.6.

In order to cause the calcium ion chelating agent to act on the calcium ions bonded to the composite body according to the present invention, the calcium ion chelating agent-containing solution is brought into contact with the composite body (for example, in the form of a pellet) according to the present invention to react the calcium ions bonded to the composite body according to the present invention with the calcium ion chelating agent in the calcium ion chelating agent-containing solution.

The calcium ion chelating agent-containing solution and the composite body according to the present invention can be brought into contact with each other by, for example, a method of suspending the composite body according to the present invention in the calcium ion chelating agent-containing solution (in the case where in an insoluble carrier on which the PS-affinity substance is immobilized, the insoluble carrier is a bead, or the like), a method of immersing the composite body according to the present invention in the calcium ion chelating agent-containing solution (in the case where in an insoluble carrier on which the PS-affinity substance is immobilized, the insoluble carrier is a disc-shaped piece, a tube, or the like), or the like.

As for the amount of the calcium ion chelating agent-containing solution to be brought into contact with the composite body according to the present invention, the amount by which the concentration of the calcium ions in the solution after being brought into contact with the composite body according to the present invention is less than the effective concentration, and the extracellular vesicles are separated from the composite body according to the present invention, may be adopted.

The temperature and time for allowing the calcium ion chelating agent to act (contact) on the composite body according to the present invention are usually 4.0° C. to 37° C., preferably 10° C. to 30° C., and more preferably 20° C. to 30° C., and usually 1 to 10 minutes, and preferably 5 to 15 minutes, respectively.

The acquisition step will be described with an example of a method using a carrier (Tim carrier) in which a Tim protein is bonded to an insoluble carrier, as follows. That is, after the composite body separation step is carried out, and as necessary, after the washing operation is further carried out, a solution containing the calcium ion chelating agent of usually 0.5 mM to 500 mM, preferably 0.5 mM to 100 mM, and more preferably 0.5 mM to 50 mM is added to the obtained composite body according to the present invention at usually 10 µL to 500 µL, preferably 20 µL to 200 µL, more preferably 50 µL to 100 µL per 1 mg of a Tim carrier, and the reaction is carried out at usually 4.0° C. to 37° C., preferably 10° C. to 30° C., and more preferably 20° C. to 30° C. for usually 1 to 30 minutes, preferably 5 to 15 minutes to separate PS-positive extracellular vesicles from the composite body according to the present invention.

By carrying out the acquisition step, the calcium ion chelating agent-containing solution brought into contact with the composite body according to the present invention contains the insoluble carrier on which the PS-affinity substance is immobilized and the extracellular vesicles separated (liberated) from the composite body according to the present invention. Therefore, in a case where the carrier on which the PS-affinity substance is immobilized is removed from the solution, and only the solution is recovered, a solution containing PS-positive extracellular vesicles can be obtained.

The stimulated MSC-derived extracellular vesicles are obtained by isolation from a cell culture supernatant liquid of the MSCs according to the present invention stimulated with a growth factor, which contains EV (that is, the cell culture supernatant liquid containing EV stimulated with a growth factor).

A method of acquiring the stimulated MSC-derived extracellular vesicles may be any conventional method used in a case of isolating EV from a sample, and examples thereof include an affinity method (for example, PS-affinity method), a fractional centrifugation method (for example, a pellet down method, a sucrose cushioning method, an ultracentrifugal method such as density gradient centrifugation method), an immunoprecipitation method, a chromatography method (for example, an ion exchange chromatography method, a gel permeation chromatography method), a density gradient method (for example, a sucrose density gradient method), an electrophoresis method (for example, an organella electrophoresis method), a magnetic separation method (for example, a magnetically activated cell sorting (MACS) method), an ultrafiltration concentration method (for example, a nanofilm ultrafiltration concentration method), a percol gradient isolation method, a method using a microfluidic device, a PEG precipitation method, and the like, an affinity method with which extracellular vesicles having a high degree of purity can be obtained or a fractional centrifugation method that enables theoretically unbiased recovery is preferable, an affinity method or an ultracentrifugal method is more preferable, and an affinity method is particularly preferable. Among the affinity methods, the PS-affinity method is preferable. The affinity method and the fractional centrifugation method may be carried out, for example, based on the method described in JP2016-088689A. One of these isolation methods may be used alone, or two or more methods may be used in combination. In addition, isolation by one isolation method may be repeated twice or more.

The cell culture supernatant liquid of the MSCs according to the present invention stimulated with a growth factor, which contains EV, is obtained by, for example, proliferating the MSCs according to the present invention stimulated with a growth factor by cell culture and by further culturing the proliferated cells in an EV production medium. The stimulation of the MSCs according to the present invention with a growth factor may be carried out by culturing the MSCs according to the present invention in the coexistence of the growth factor. The MSC cell culture according to the present invention and the culture in the EV production culture medium may be carried out according to a conventional method carried out in this field, and the medium and culture conditions used are not particularly limited.

The extracellular vesicles according to the present invention are preferably PS-positive extracellular vesicles, more preferably extracellular vesicles that are derived from the MSCs according to the present invention stimulated with a growth factor, and that are obtained by a method (PS-affinity method) using a substance having an affinity for phosphatidylserine, still more preferably extracellular vesicles that are derived from the MSCs according to the present invention stimulated with a growth factor and that are obtained by a PS-affinity method in which a Tim protein is used, particularly preferably extracellular vesicles that are derived from the MSCs according to the present invention stimulated with a growth factor and that are obtained by the PS-affinity method of using Tim4 protein, Tim3 protein, or Tim1 protein, still more preferably extracellular vesicles that are derived from the MSCs according to the present invention stimulated with a growth factor (VEGF, TGFβ1, TGF3, or bFGF) and that are obtained by the PS-affinity method of using Tim4 protein, and most preferably extracellular vesicles that are derived from the MSCs according to the present invention stimulated with VEGF or bFGF and that are obtained by the PS-affinity method of using Tim4 protein.

The extracellular vesicles according to the present invention thus prepared had an angiogenesis action (angiogenesis effect). Therefore, the angiogenesis agent provided in the present invention is based on an angiogenesis action by the extracellular vesicles according to the present invention, as an active ingredient, and can be an effective therapeutic medication for diseases in which the angiogenesis action may be involved, for example, peripheral vascular disease such as arteriosclerosis obliterans, chronic arteriosclerosis obliterans, diabetes, necrosis, Raynaud's disease, Buerger's disease, heart disease such as myocardial infarction, dilated myocardium, angina, and patients with brain diseases such as brain contusion, parkinson's disease, multiple sclerosis and cerebral infarction. The angiogenesis agent of the present invention can be an effective therapeutic medication in the field of skin regenerative medicine by promoting damaged autologous skin regeneration, improving the engraftment rate of the transplanted skin on the covering site of the transplanted skin in skin grafting such as epidermis, and the like. The angiogenesis agent of the present invention can promote bone formation and accelerate the treatment rate by carrying the angiogenesis agent of the present invention on a fixing device in treatment with the fixing device in a case where fracture occurs. In addition, the angiogenesis agent of the present invention can contain osteoblasts, chondrocytes, and the like to further promote bone formation.

The angiogenesis agent provided in the present invention basically contains the extracellular vesicles according to the present invention obtained by isolation from the MSC-derived extracellular vesicles according to the present invention, as an active ingredient, and the dosage form for administration is a solution containing the extracellular vesicles according to the present invention as is, or a pharmaceutically acceptable carrier as needed, or a form formulated as a liquid agent, a suspending agent, a lipo agent, or the like with an additive, or furthermore, a form formulated as a solid agent such as a tablet with a pharmaceutically acceptable additive, as a powder by freeze-drying.

Examples of such carriers and additives include tonicity adjusting agents, thickeners, saccharides, sugar alcohols, antiseptics (preservatives), bactericides or antibacterial agents, pH adjusters, stabilizers, chelating agents, oleaginous bases, gel bases, surfactants, suspending agents, bonding agents, excipients, lubricants, disintegrants, foaming agents, fluidizing agents, dispersants, emulsifiers, buffers, solubilizing agents, antioxidants, sweeteners, acidulating agents, colorants, flavoring agents, perfumes, and cooling agents, but not limited thereto.

Examples of typical carriers, additives, and the like can include the following. Examples of the carriers include an aqueous carrier such as water and hydrous ethanol. Examples of the tonicity adjusting agents include inorganic salts such as sodium chloride, potassium chloride, calcium chloride, and magnesium chloride. Examples of the polyhydric alcohols include glycerin, propylene glycol, polyethylene glycol, and the like. Examples of the thickeners include carboxyvinyl polymer, hydroxyethyl cellulose, hydroxypropylmethyl cellulose, methyl cellulose, alginic acid, polyvinyl alcohol (completely or partially saponified), polyvinylpyrrolidone, macrogol, and the like.

Examples of the saccharides include cyclodextrin, glucose, fructose, lactose, and the like. Examples of sugar alcohols include sugar alcohols such as xylitol, sorbitol, and mannitol. Examples of antiseptics, bactericides, or antibacterial agents include dibutylhydroxytoluene, benzalkonium chloride, benzethonium chloride, chlorhexidine gluconate, sodium dehydroacetate, methyl paraoxybenzoate, ethyl paraoxybenzoate, propyl paraoxybenzoate, butyl sugar paraoxybenzoate. Examples of the pH adjusters include hydrochloric acid, boric acid, aminoethylsulfonic acid, citric acid, acetic acid, sodium hydroxide, potassium hydroxide, calcium hydroxide, magnesium hydroxide, sodium hydrogencarbonate, sodium carbonate, borosand, triethanolamine, monoethanolamine, diisopropanolamine, sulfuric acid, magnesium sulfate, phosphoric acid, polyphosphate, propionic acid, oxalic acid, gluconic acid, fumaric acid, lactic acid, tartaric acid, malic acid, succinic acid, and the like.

Examples of the stabilizers include dibutylhydroxytoluene, trometamol, sodium formaldehyde sulfoxylate (rongalite), tocopherol, sodium pyrosulfite, monoethanolamine, aluminum monostearate, glycerin monostearate, sodium hydrogen sulfite, sodium sulfite, and the like. Examples of the bases include vegetable oils such as olive oil, corn oil, soybean oil, sesame oil, and cottonseed oil; oleaginous bases such as medium-chain fatty acid triglycerides; aqueous bases such as Macrogol 400; gel bases such as carboxyvinyl polymers and gums. Examples of the surfactants include polysorbate 80, hardened castor oil, glycerin fatty acid ester, sorbitan sesquioleate, and the like, and examples of the suspending agents include white beeswax and various surfactants, gum arabic, gum arabic powder, xanthan gum, soy lecithin, and the like.

Furthermore, examples of the bonding agents include hydroxyethyl cellulose, hydroxypropyl cellulose, hydroxypropylmethyl cellulose, sodium carboxymethyl cellulose, polyvinylpyrrolidone, polyvinyl alcohol, and the like, examples of the excipients include sucrose, lactose, starch, corn starch, crystalline cellulose, light anhydrous silicic acid, and the like, examples of the lubricants include sucrose fatty acid ester, magnesium stearate, talc, and the like, examples of the disintegrants include low-substituted hydroxypropyl cellulose, crospovidone, croscarmellose sodium, and the like, and examples of the fluidizing agents include sodium aluminometasilicate, light anhydrous silicic acid, and the like.

The angiogenesis agent provided in the present invention is preferably formulated as a liquid agent, a suspending agent, or a lipo agent, and is basically obtained by mixing the solution containing the extracellular vesicles according to the present invention obtained by isolation from MSC-derived extracellular vesicles with, for example, saline, 5% glucose solution, lipo emulsion, or the like together with the above described carriers and additives, as necessary. In addition, freeze-dried powder can be used for dissolution before use or the suspension-type preparation.

In a case where the angiogenesis agent provided in the present invention is a liquid agent, a suspending agent, or a lipo agent, the pH of the angiogenesis agent is not particularly limited as long as the pH thereof is within a pharmaceutically, pharmacologically or physiologically acceptable range, and examples of the range include a range of pH 2.5 to 9.0, preferably 3.0 to 8.5, and more preferably 3.5 to 8.0, and the pH can be adjusted appropriately with a pH adjuster.

An administration route of the angiogenesis agent provided in the present invention includes oral administration, subcutaneous administration, intramuscular administration, intravenous administration, intraarterial administration, intrathecal administration, and intraperitoneal administration, depending on the dosage form. Although the dose varies depending on a condition of a target patient (body weight, age, symptoms, physical condition, and the like), dosage form, and the like, the number of particles is usually $1 \times 10^5$ to $1 \times 10^{17}$ pieces/time, preferably $5 \times 10^5$ to $5 \times 10^{16}$ pieces/time, still more preferably $1 \times 10^6$ to $1 \times 10^{16}$ pieces/time, and particularly preferably $5 \times 10^6$ to $5 \times 10^{15}$ pieces/time but in a case of the administration to an adult. This dose may be used as a single dose and may be administered multiple times a day, and this dose may be divided into a plurality of times and administered.

EXAMPLES

Hereinafter, the present invention will be specifically described based on Examples and Comparative Examples, but the present invention is not limited to these examples.

Example 1. Acquisition of Extracellular Vesicle by PS-Affinity Method (1) Cell Culture Poietics (trademark) human mesenchymal stem cells (Lonza.), which are bone marrow-derived mesenchymal stem cells, were cultured in MEMα (L-glutamine, phenol red contained, FUJIFILM Wako Pure Chemical Corporation) containing 15% FBS (Selborne Biological Services Pty. Co., Ltd.) used as a proliferated culture medium. Thereafter, the cultured bone marrow-derived mesenchymal stem cells were seeded in a 100 mm cell culture dish (Corning Incorporated) with a cell count of $3 \times 10^5$, cultured in a cell culture incubator set under conditions of 5% $CO_2$ and 37° C. for 72 hours, and proliferated to a cell count of $3 \times 10^6$.

(2) Production of Extracellular Vesicle

The culture medium was substituted with 20 mL D-MEM (FUJIFILM Wako Pure Chemical Corporation) containing 10% GIBCO, extracellular vesicle production culture medium: Fetal Bovine Serum, exosome-depleted, One Shot (trademark) format (Thermo Fisher Scientific Inc.), and the bone marrow-derived mesenchymal stem cells proliferated in (1) were cultured in a cell culture incubator set under conditions of 5% $CO_2$ and 37° C. for 120 hours. Thereafter, the obtained culture supernatant was recovered into a 50 mL centrifuge tube and centrifuged at 2,000×g for 20 minutes, and the supernatant was recovered.

(3) Acquisition of Extracellular Vesicle by PS-Affinity Method

Extracellular vesicles were isolated from 1 mL of the culture supernatant recovered in (2) using MagCapture (trademark) Exosome Isolation Kit PS (FUJIFILM Wako Pure Chemical Corporation) according to a procedure described in the instruction manual attached to the kit to obtain extracellular vesicles in 1 mM EDTA-containing phosphate-buffered saline (PBS) to which an EV-Save (trademark) extracellular vesicle blocking reagent (FUJIFILM Wako Pure Chemical Corporation) was added. Thereafter, the buffer was exchanged with PBS to which EV-Save (trademark) extracellular vesicle blocking reagent was added, by using Vivaspin 500 (Sartorius AG, molecular weight cut-off: 100,000 (100K), membrane material: PES). Hereinafter, the obtained solution may be referred to as an "extracellular vesicle solution (PS-affinity method)".

Comparative Example 1. Acquisition of Extracellular Vesicle by Ultracentrifugal Method The culture supernatant prepared according to the same method as in Example 1(1) and (2) was centrifuged at 110,000×g for 70 minutes, by using an ultracentrifuge (Beckman: Optima (trademark) L-100XP). As a result, pellets were obtained, 1 mL of PBS was added to the obtained pellets, and the mixture was centrifuged again at 110,000×g for 70 minutes. The finally obtained pellets were dissolved with PBS to which an EV-Save (trademark) extracellular vesicle blocking reagent was added (FUJIFILM Wako Pure Chemical Corporation). Hereinafter, the obtained solution may be referred to as an "extracellular vesicle solution (ultracentrifugal method)".

Experimental Example 1. Measurement of the Number of Particles of Extracellular Vesicles by Nanotracking Analysis Method The number of particles of the "extracellular vesicle solution (PS-affinity method)" obtained in Example 1 per unit volume was measured by a nanoparticle tracking analysis method (nano tracking analysis method) using NanoSight (Malvern Panalytical Ltd) according to a procedure described in the manual of NanoSight, and an average particle size and an average number of particles per unit volume [particles/mL] were calculated. A graph of the obtained particle size distribution is illustrated in FIG. 1 together with the results of Experimental Example 2. In the graph of FIG. 1, the vertical axis indicates the number of particles, and the horizontal axis indicates the particle size. The average particle size of the extracellular vesicles acquired by the PS-affinity method was 138.1±0.2 nm, and the average number of particles per unit volume was $1.76 \times 10^{10}$ [particles/mL].

Experimental Example 2. Measurement of the Number of Particles of Extracellular Vesicles by Nanotracking Analysis Method An average particle size and an average number of particles per unit volume [particles/mL] were calculated according to the same method as in Experimental Example 1, except that the "extracellular vesicle solution (ultracentrifugal method)" obtained in Comparative Example 1 was used instead of the "extracellular vesicle solution (PS-affinity method)". A graph of the obtained particle size distribution is illustrated in FIG. 1 together with the results of Experimental Example 1. The average particle size of the extracellular vesicles acquired by the ultracentrifugal method was 138.1±2.9 nm, and the average number of particles per unit volume was $1.68 \times 10^{10}$ [particles/mL].

Experimental Example 3. Analysis of Extracellular Vesicle Marker Protein by Western Blotting Method Extracellular vesicle marker proteins CD9, CD63, and CD81 were analyzed by a Western blotting technique by using the "extracellular vesicle solution (PS-affinity method)" obtained in Example 1.

Based on the average number of particles per unit volume in the "extracellular vesicle solution (PS-affinity method)" calculated in Experimental Example 1, ¼ amount of SDS-PAGE Sample Buffer 4-fold concentrated solution (without a reducing agent) was mixed with $3.0 \times 10^8$ particles of the "extracellular vesicle solution (PS-affinity method)" (FUJIFILM Wako Pure Chemical Corporation), and the total amount was subjected to electrophoresis on a 10% to 20% acrylamide gel (FUJIFILM Wako Pure Chemical Corporation). Thereafter, the transcription was carried out to a PVDF membrane (Bio-Rad Laboratories, Inc.) by using a transfer buffer (FUJIFILM Wako Pure Chemical Corporation). The transferred membrane was immersed in a PBS-T solution containing 1% skim milk (0.1 (w/v) % Tween (trademark) 20-containing PBS solution) for 1 hour and was subjected to blocking treatment, and each of anti-CD9 antibodies (FUJIFILM Wako Pure Chemical Corporation), anti-CD63 antibodies (FUJIFILM Wako Pure Chemical Corporation), and anti-CD81 antibodies (FUJIFILM Wako Pure Chemical Corporation) was allowed to react with a primary antibody solution adjusted to 1.1 µg/mL with a PBS-T solution. Thereafter, the membrane on which the anti-CD9 antibodies and the anti-CD81 antibodies had reacted was allowed to react with a secondary antibody solution obtained by diluting HRP-flagged anti-rat IgG antibodies (Jackson ImmunoResearch Inc.) to 10,000 times with a PBS-T solution, and the membrane on which the anti-CD63 antibodies had reacted was allowed to react with a secondary antibody solution obtained by diluting HRP-flagged anti-mouse IgG antibodies (Agilent Technologies, Inc.) with a PBS-T solution to 10,000 times. Thereafter, Immunostar (trademark) Zeta (FUJIFILM Wako Pure Chemical Corporation) was used as a detection reagent to detect a signal by using Amersham Imager 600 (General Electric Company). The results of Western blotting are illustrated in FIG. 2 together with the results of Experimental Example 4. In the figure, PS on the horizontal axis represents the result in a case where the "extracellular vesicle solution (PS-affinity method)" is used (Experimental Example 3), and UC represents the result in a case where the "extracellular vesicle solution (ultracentrifugal method)" is used (Experimental Example 4). The arrows on the vertical axis indicate band positions of the detected extracellular vesicle marker proteins.

Experimental Example 4. Analysis of Extracellular Vesicle Marker Protein by Western Blotting Method Extracellular vesicle marker proteins CD9, CD63, and CD81 were analyzed by a Western blotting technique according to the same method as in Experimental Example 3, except that the "extracellular vesicle solution (ultracentrifugal method)" obtained in Comparative Example 1 was used instead of the "extracellular vesicle solution (PS-affinity method)". The result of Western blotting is illustrated in FIG. 2 together with the result of Experimental Example 3.

It was found from FIG. 2 that expression levels of CD9 and CD63 of the extracellular vesicles acquired by the PS-affinity method [extracellular vesicles in the "extracellular vesicle solution (PS-affinity method)", Experimental Example 3] were higher than those of the obtained extracellular vesicles [extracellular vesicles in the "extracellular vesicle solution (ultracentrifugal method)", Experimental Example 4] acquired by the ultracentrifugal method.

Example 2. Evaluation of Angiogenesis Action of Extracellular Vesicle Acquired by PS-Affinity Method The angiogenesis action of the extracellular vesicles in the "extracellular vesicle solution (PS-affinity method)" prepared in Example 1 was evaluated.

Geltrex (Thermo Fisher Scientific Inc.) was added to 96-well plate (Corning Incorporated) in an amount of 35 µL, and the mixture was left to stand at 37° C. for 30 minutes. HUVEC cells (Sartorius AG), which are human umbilical vein endothelial cells, were suspended in Medium 200 (Thermo Fisher Scientific Inc.), and the "extracellular vesicle solution (PS-affinity method)" obtained in Example 1 was added so as to have a final concentration of $6 \times 10^8$ particles/mL based on the average number of particles per unit volume in the "extracellular vesicle solution (PS-affinity method)" calculated in Experimental Example 1, to obtain a extracellular vesicle-HUVEC cell-containing medium. Thereafter, the extracellular vesicle-HUVEC cell-containing medium was seeded in 96-well plate coated with the Geltrex in an amount with a cell count of $5 \times 10^5$ per well. After culturing at 37° C. for 8 hours, an image of each of cells was acquired by using CloneSelect Imager (Molecular Devices, LLC.) (Example 2).

Figure 3:
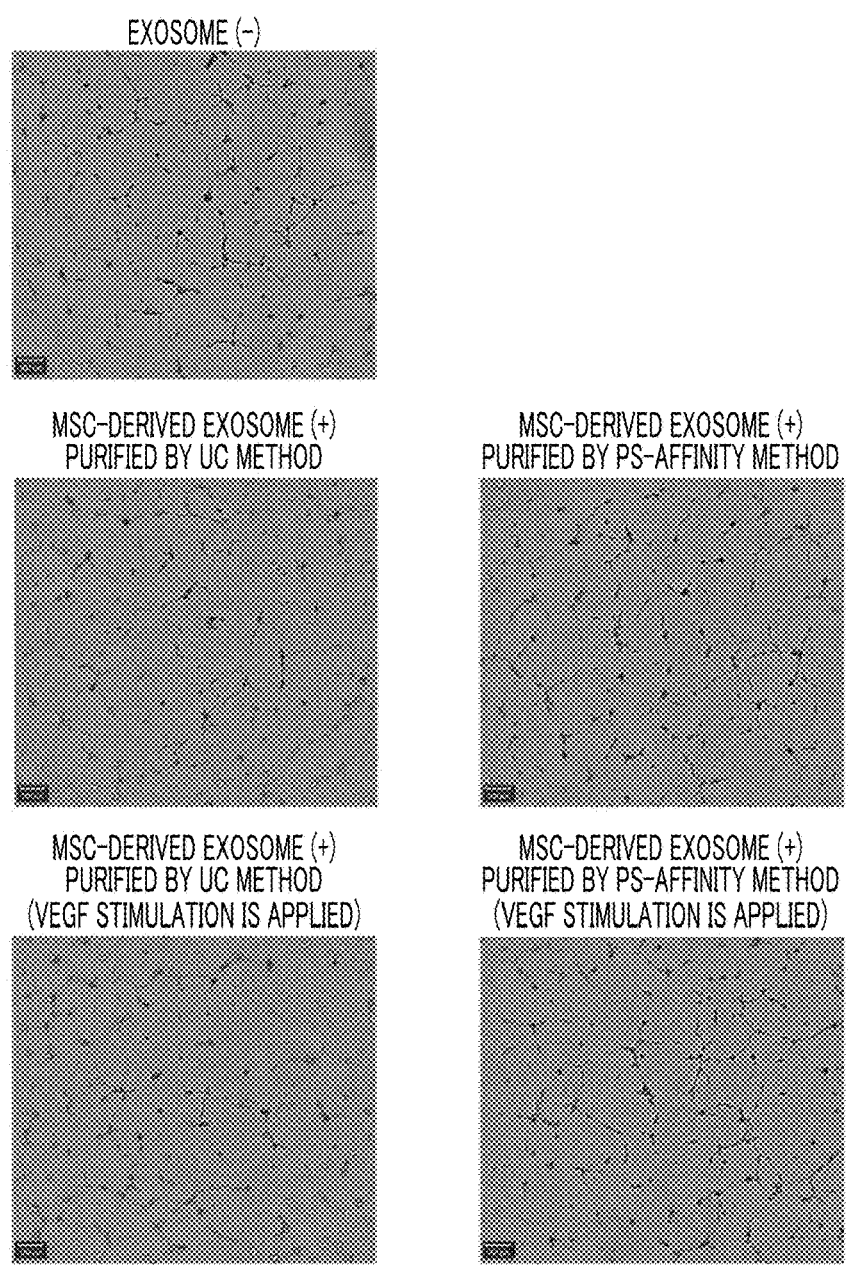
FIG. 3 is an image of cells illustrating the results of evaluating an angiogenesis action of MSC-derived extracellular vesicles based on tube formation in HUVEC cells as an index.

The results of the obtained cell images are illustrated in FIG. 3 together with the results of Examples 3 and 4, and Comparative Example 2. In the figures, "EXOSOME (−) represents the result of control without addition of extracellular vesicles, MSC-DERIVED EXOSOME (+) PURIFIED BY PS-AFFINITY METHOD represents the result in a case of using the "extracellular vesicle solution (PS-affinity method)" (Example 2), MSC-DERIVED EXOSOME (+)

PURIFIED BY UC METHOD represents the result in a case of using the "extracellular vesicle solution (ultracentrifugal method)" (Comparative Example 2), MSC-DERIVED EXOSOME (+) PURIFIED BY PS-AFFINITY METHOD (VEGF stimulation is applied) represents the result in a case of using the "extracellular vesicle solution (PS-affinity method, VEGF stimulation)" (Example 3), and MSC-DERIVED EXOSOME (+) PURIFIED BY UC METHOD (VEGF stimulation is applied) represents the result in a case of using the "extracellular vesicle solution (ultracentrifugal method, VEGF stimulation)" (Example 4).

Comparative Example 2. Evaluation of Angiogenesis Action of Extracellular Vesicle Acquired by Ultracentrifugal Method The angiogenesis action of the extracellular vesicles was evaluated according to the same method as in Example 2, except that the "extracellular vesicle solution (ultracentrifugal method)" obtained in Comparative Example 1 was used instead of the "extracellular vesicle solution (PS-affinity method)". The results of the obtained cell images are illustrated in FIG. 3 together with the results of Examples 2 to 4.

Example 3. Evaluation of Angiogenesis Action of Extracellular Vesicle Derived from VEGF-Stimulated Mesenchymal Stem Cell Acquired by PS-Affinity Method After proliferating bone marrow-derived mesenchymal stem cells by the same method as in Example 1 (1) Cell Culture, stimulation with VEGF (FUJIFILM Wako Pure Chemical Corporation) of 100 ng/mL was further carried out, and furthermore, culturing for 24 hours was carried out. Next, extracellular vesicles were isolated according to the same method as in Example 1 (2) Production of Extracellular Vesicle and Example 1 (3) Acquisition of Extracellular Vesicle by PS-affinity method, and the buffer was exchanged with PBS to which a EV-Save (trademark) extracellular vesicle blocking reagent was added. Hereinafter, the obtained solution may be referred to as an "extracellular vesicle solution (PS-affinity method, VEGF stimulation)". The average particle size and the average number of particles per unit volume [particles/mL] of the obtained "extracellular vesicle solution (PS-affinity method, VEGF stimulation)" were calculated by the same method as in Experimental Example 1. In addition, the angiogenesis action of the extracellular vesicles was evaluated according to the same method as in Example 2, except that the "extracellular vesicle solution (PS-affinity method, VEGF stimulation)" was used instead of the "extracellular vesicle solution (PS-affinity method)". The results of the obtained cell images are illustrated in FIG. 3 together with the results of Examples 2 and 4, and Comparative Example 2.

Example 4. Evaluation of Angiogenesis Action of Extracellular Vesicle Derived from VEGF-Stimulated Mesenchymal Stem Cell Acquired by Ultracentrifugal Method After proliferating bone marrow-derived mesenchymal stem cells by the same method as in Example 1 (1) Cell Culture, stimulation with VEGF (FUJIFILM Wako Pure Chemical Corporation) of 100 ng/mL was further carried out, and furthermore, culturing for 24 hours was carried out. Next, the culture supernatant prepared according to the same method as in Example 1(2) Production of Extracellular Vesicle was centrifuged at 110,000×g for 70 minutes, by using an ultracentrifuge (Beckman: Optima (trademak) L-100XP). As a result, pellets were obtained, 1 mL of PBS was added to the obtained pellets, and the mixture was centrifuged again at 110,000×g for 70 minutes. The finally obtained pellets were dissolved with PBS to which an EV-Save (trademark) extracellular vesicle blocking reagent was added (FUJIFILM Wako Pure Chemical Corporation). Hereinafter, the obtained solution may be referred to as an "extracellular vesicle solution (ultracentrifugal method, VEGF stimulation)". The average particle size and the average number of particles per unit volume [particles/mL] of the obtained "extracellular vesicle solution (PS-affinity method, VEGF stimulation)" were calculated by the same method as in Experimental Example 1. In addition, the angiogenesis action of the extracellular vesicles was evaluated according to the same method as in Example 2, except that the "extracellular vesicle solution (ultracentrifugal method, VEGF stimulation)" was used instead of the "extracellular vesicle solution (PS-affinity method)". The results of the obtained cell images are illustrated in FIG. 3 together with the results of Examples 2 and 3, and Comparative Example 2.

Figure 4:
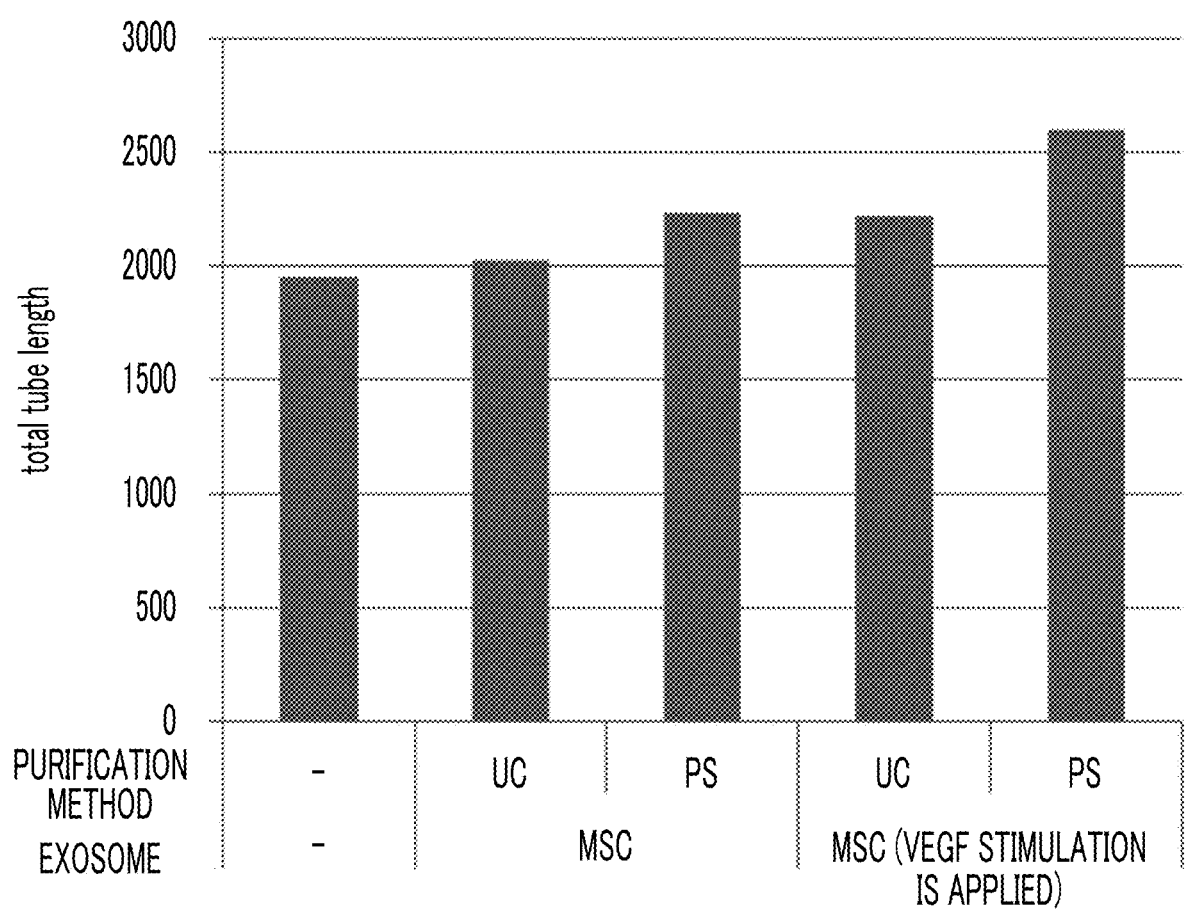
FIG. 4 is a diagram illustrating the results of evaluating an angiogenesis action of MSC-derived extracellular vesicles based on tube formation in HUVEC cells as an index.

Example 5. Evaluation of Angiogenesis Action of Extracellular Vesicle Acquired by PS-Affinity Method Cell images acquired in Example 2 were analyzed for the total tube length using an image analysis software Image J's angiogenesis analyzer to evaluate an angiogenesis action of HUVEC cells by the extracellular vesicles [the extracellular vesicles in the "extracellular vesicle solution (PS-affinity method)"] acquired by the PS-affinity method. The result of the obtained total tube length is illustrated in FIG. 4 together with the results of Examples 6 and 7, and Comparative Example 3. In FIG. 4, the vertical axis indicates the total tube length, the horizontal axis indicates acquisition conditions of the extracellular vesicles used, "PURIFICATION METHOD (–), EXOSOME (–)" represents the result of control without addition of extracellular vesicles, "PURIFICATION METHOD UC EXOSOME MSC" represents the result in a case of using the "extracellular vesicle solution (ultracentrifugal method)" (Comparative Example 3), "PURIFICATION METHOD PS EXOSOME MSC" represents the result in a case of using the "extracellular vesicle solution (PS-affinity method)" (Example 5), "PURIFICATION METHOD UC EXOSOME MSC (VEGF stimulation is applied)" represents the result in a case of using the "extracellular vesicle solution (ultracentrifugal method, VEGF stimulation)" (Example 7), and "PURIFICATION METHOD PS EXOSOME MSC (VEGF stimulation is applied)" represents the result in a case of using the "extracellular vesicle solution (PS-affinity method, VEGF stimulation)" (Example 6).

Comparative Example 3. Evaluation of Angiogenesis Action of Extracellular Vesicle Acquired by Ultracentrifugal Method Cell images acquired in Comparative Example 2 were analyzed for the total tube length using an image analysis software Image J's angiogenesis analyzer to evaluate an angiogenesis action of HUVEC cells by the extracellular vesicles (the extracellular vesicles in the "extracellular vesicle solution (ultracentrifugal method)") acquired by the ultracentrifugal method. The result of the obtained total tube length is illustrated in FIG. 4 together with the results of Examples 5 to 7.

Example 6. Evaluation of Angiogenesis Action of Extracellular Vesicle Derived from VEGF-Stimulated Mesenchymal Stem Cell Acquired by PS-Affinity Method Cell images acquired in Example 3 were analyzed for the total tube length using an image analysis software Image J's angiogenesis analyzer to evaluate an angiogenesis action of HUVEC cells by the extracellular vesicles derived from VEGF-stimulated mesenchymal stem cells [the extracellular vesicles in the "extracellular vesicle solution (PS-affinity method, VEGF stimulation)"] acquired by the PS-affinity method. The result of the obtained total tube length is illustrated in FIG. 4 together with the results of Examples 5 and 7, and Comparative Example 3.

Example 7. Evaluation of Angiogenesis Action of Extracellular Vesicle Derived from VEGF-Stimulated Mesenchymal Stem Cell Acquired by Ultracentrifugal Method Cell images acquired in Example 4 were analyzed for the total tube length using an image analysis software Image J's angiogenesis analyzer to evaluate an angiogenesis action of HUVEC cells by the extracellular vesicles derived from VEGF-stimulated mesenchymal stem cells [the extracellular vesicles in the "extracellular vesicle solution (ultracentrifugal method, VEGF stimulation)"] acquired by the ultracentrifugal method. The result of the obtained total tube length is illustrated in FIG. 4 together with the results of Examples 5 and 6, and Comparative Example 3.

It was found from FIGS. 3 and 4 that the extracellular vesicles (Examples 2, 3, 5, and 6) acquired by the PS-affinity method promote tube formation that reflects angiogenesis by HUVEC cells (having the angiogenesis action). In addition, it was found that the extracellular vesicles acquired by the PS-affinity method (Examples 2, 3, 5, and 6) have a higher angiogenesis action than the extracellular vesicles acquired by the ultracentrifugal method (Comparative Examples 2 and 3). In addition, it was found that the extracellular vesicles (Examples 3, 4, 6, and 7) acquired from the mesenchymal stem cells stimulated with VEGF had a higher angiogenesis action than the extracellular vesicles acquired from the mesenchymal stem cells (Examples 2 and 5, Comparative Examples 2 and 3) to which stimulation was not applied. Furthermore, the extracellular vesicles (Examples 3 and 6) acquired from the mesenchymal stem cells stimulated with VEGF by the PS-affinity method had a particularly remarkable angiogenesis action than the extracellular vesicles (Examples 4 and 7) acquired by another means, such as extracellular vesicles acquired from the mesenchymal stem cells stimulated with VEGF by the ultracentrifugal method.

Examples 8 and 9. Acquisition of Extracellular Vesicle by PS-Affinity Method Extracellular vesicles were acquired by the same method as in Example 1 except that "human adipose-derived stem cells (Lonza.) that are adipose-derived mesenchymal stem cells" or "human mesenchymal stem cells from umbilical cord matrix (PromoCell GmbH), which are umbilical cord-derived mesenchymal stem cells" was used instead of Poietics (trademark) human mesenchymal stem cells that are bone marrow-derived mesenchymal stem cells (Lonza.), and an "extracellular vesicle solution (PS-affinity method, adipose-derived MSC)" (Example 8) and an "extracellular vesicle solution (PS-affinity method, umbilical cord-derived MSC)" (Example 9) were individually obtained.

Comparative Examples 4 and 5. Acquisition of Extracellular Vesicle by Ultracentrifugal Method Culture supernatant prepared according to the same method as in Example 1(1) and (2) was centrifuged by using an ultracentrifuge (Beckman: Optima (trademark) L-100XP) at 110,000×g for 70 minutes, except that each of "human adipose-derived stem cells (Lonza.) that are adipose-derived mesenchymal stem cells" and "human mesenchymal stem cells from umbilical cord matrix (PromoCell GmbH), which are umbilical cord-derived mesenchymal stem cells" was used instead of "Poietics (trademark) human mesenchymal stem cells that are bone marrow-derived mesenchymal stem cells (Lonza.). As a result, pellets were obtained, 1 mL of PBS was added to the obtained pellets, and the mixture was centrifuged again at 110,000×g for 70 minutes. The finally obtained pellets were dissolved with PBS to which an EV-Save (trademark) extracellular vesicle blocking reagent was added (FUJIFILM Wako Pure Chemical Corporation), and an "extracellular vesicle solution (ultracentrifugal method, adipose-derived MSC)" (Comparative Example 4) and an "extracellular vesicle solution (ultracentrifugal method, umbilical cord-derived MSC)" (Comparative Example 5) were individually obtained.

Examples 10 to 12. Acquisition of Bone Marrow MSC-Derived Extracellular Vesicle Stimulated by PS-Affinity Method After proliferating bone marrow-derived mesenchymal stem cells by the same method as in Example 1 (1) Cell Culture, stimulation with each of VEGF of 100 ng/mL (FUJIFILM Wako Pure Chemical Corporation), bFGF of 10 ng/mL, and TGFβ1 of 20 ng/mL was further carried out, and furthermore, culturing for 24 hours was carried out. Next, the extracellular vesicles were isolated by the same method as in Example 1 (2) Production of Extracellular Vesicle and Example 1 (3) Acquisition of Extracellular Vesicle by PS-affinity method, and the buffer was exchanged with PBS to which a EV-Save (trademark) extracellular vesicle blocking reagent was added, to obtain the "extracellular vesicle solution (PS-affinity method, bone marrow-derived MSC, VEGF stimulation)" (Example 10), the "extracellular vesicle solution (PS-affinity method, bone marrow-derived MSC, bFGF stimulation)" (Example 11), and the "extracellular vesicle solution (PS-affinity method, bone marrow-derived MSC, TGFβ1 stimulation) (Example 12), individually.

Examples 13 to 15. Acquisition of Adipose MSC-Derived Extracellular Vesicle Stimulated by PS-Affinity Method An "extracellular vesicle solution (PS-affinity method, adipose-derived MSC, VEGF stimulation)" (Example 13) and an "extracellular vesicle solution (PS-affinity method, adipose-derived MSC, bFGF stimulation)" (Example 14) were obtained by the same method as in Examples 10 and 11, except that "human adipose-derived stem cells (Lonza.) that are adipose-derived mesenchymal stem cells" was used instead of "Poietics (trademark) human mesenchymal stem cells that are bone marrow-derived mesenchymal stem cells" (Lonza.). In addition, an "extracellular vesicle solution (PS-affinity method, adipose-derived MSC, TGFβ3 stimulation)" (Example 15) was individually obtained by the same method as in Example 10, except that "human adipose-derived stem cells (Lonza.) that are adipose-derived mesenchymal stem cells" was used, and stimulation was carried out with TGFβ3 (20 ng/mL) instead of "Poietics (trademark) human mesenchymal stem cells that are bone marrow-derived mesenchymal stem cells" (Lonza.).

Example 16. Acquisition of Umbilical Cord MSC-Derived Extracellular Vesicle Stimulated by PS-Affinity Method An "extracellular vesicle solution (PS-affinity method, umbilical cord-derived MSC, VEGF stimulation)" was obtained by the same method as in Example 10 except that "human mesenchymal stem cells from umbilical cord matrix (PromoCell GmbH), which are umbilical cord-derived mesenchymal stem cells" was used instead of "Poietics (trademark) human mesenchymal stem cells that are bone marrow-derived mesenchymal stem cells" (Lonza.).

Examples 17 to 19. Acquisition of Bone Marrow MSC-Derived Extracellular Vesicle Stimulated by Ultracentrifugal Method After proliferating bone marrow-derived mesenchymal stem cells by the same method as in Example 1 (1) Cell Culture, stimulation with each of VEGF of 100 ng/mL (FUJIFILM Wako Pure Chemical Corporation), bFGF of 10 ng/mL, and TGFβ1 of 20 ng/mL was further carried out, and furthermore, culturing for 24 hours was carried out. Next, the extracellular vesicles were isolated by the same method as in Example 1 (2) Production of Extracellular Vesicle and Example 1 (3) Acquisition of Extracellular Vesicle by PS-affinity method, and the buffer was exchanged with PBS to which an EV-Save (trademark) extracellular vesicle blocking reagent was added, to obtain the "extracellular vesicle solution (ultracentrifugal method, bone marrow-derived MSC, VEGF stimulation)" (Example 17), the "extracellular vesicle solution (ultracentrifugal method, bone marrow-derived MSC, bFGF stimulation)" (Example 18), and the "extracellular vesicle solution (ultracentrifugal method, bone marrow-derived MSC, TGFβ1 stimulation) (Example 19), individually.

Examples 20 and 21. Acquisition of Adipose MSC-Derived Extracellular Vesicle Stimulated by Ultracentrifugal Method Adipose-derived mesenchymal stem cells "human adipose-derived stem cells (LONZA) which are adipose-derived mesenchymal stem cells" were proliferated by the same method as in Example 1 (1) Cell Culture, and then further stimulated with VEGF of 100 ng/mL (FUJIFILM Wako Pure Chemical Corporation) and bFGF of 10 ng/mL, respectively, and the culturing was carried out for 24 hours. Next, the extracellular vesicles were isolated by the same method as in Example 1 (2) Production of Extracellular Vesicle and Example 1 (3) Acquisition of Extracellular Vesicle by PS-affinity method, and the buffer was exchanged with PBS to which an EV-Save (trademark) extracellular vesicle blocking reagent was added, to obtain the "extracellular vesicle solution (ultracentrifugal method, adipose-derived MSC, VEGF stimulation)" (Example 20), and the "extracellular vesicle solution (ultracentrifugal method, adipose-derived MSC, bFGF stimulation) (Example 21), individually.

Example 22. Acquisition of Umbilical Cord-Derived Extracellular Vesicle Stimulated by Ultracentrifugal Method Umbilical cord-derived mesenchymal stem cells "human mesenchymal stem cells from umbilical cord matrix (PromoCell GmbH) which are umbilical cord-derived mesenchymal stem cells" were proliferated by the same method as in Example 1 (1) Cell Culture, and then further stimulated with VEGF of 100 ng/mL (FUJIFILM Wako Pure Chemical Corporation), and the culturing was carried out for 24 hours. Next, extracellular vesicles were isolated according to the same method as in Example 1 (2) Production of Extracellular Vesicle and Example 1 (3) Acquisition of Extracellular Vesicle by PS-affinity method, the buffer was exchanged with PBS to which an EV-Save (trademark) extracellular vesicle blocking reagent was added, and an "extracellular vesicle solution (ultracentrifugal method, umbilical cord-derived MSC, VEGF stimulation)" was obtained.

Examples 23 to 38 and Comparative Examples 6 to 8. Evaluation of Angiogenesis Action of Extracellular Vesicle Acquired by Ultracentrifugal Method and PS-Affinity Method An angiogenesis action of extracellular vesicles in each of the "extracellular vesicle solutions" prepared in Examples 1 and 8 to 22, and Comparative Examples 1, 4, and 5 was evaluated, individually. The "extracellular vesicle solution" used in each of Examples and Comparative Examples is illustrated in Table 1 below. 40 μL of Corning Matrigel (Corning Incorporated) was added to 96-well plate (Corning Incorporated), and the mixture was left to stand at 37° C. for 30 minutes. HUVEC cells (Sartorius), which are human umbilical vein endothelial cells, are suspended in D-MEM (FUJIFILM Wako Pure Chemical Corporation), and each "extracellular vesicle solution" was added so as to have a final concentration of $2.5 \times 10^9$ particles/mL, to obtain an extracellular vesicle HUVEC cell-containing medium. Thereafter, the extracellular vesicle-HUVEC cell-containing medium was seeded in 96-well plate coated with the Corning Matrigel in an amount with a cell count of $3 \times 10^4$ per well. After culturing at 37° C. for 15 hours, an image of each of cells was acquired by using CloneSelect Imager (Molecular Devices, LLC.). The results of the images of the obtained cells are illustrated in FIG. 5. FIG. 5A illustrates the results of using extracellular vesicles acquired from bone marrow-derived MSC, FIG. 5B illustrates the results of using extracellular vesicles acquired from adipose-derived MSC, and FIG. 5C illustrates the results of using extracellular vesicles acquired from umbilical cord-derived MSC, respectively. In the figures, "UC METHOD PURIFICATION" indicates that the extracellular vesicles purified by the ultracentrifugal method were used, and "PS-AFFINITY METHOD PURIFICATION" indicates that the extracellular vesicles purified by the PS-affinity method were used. In addition, EXTRACELLULAR VESICLE (−) indicates that no extracellular vesicles were added, and EXTRACELLULAR VESICLE (+) indicates that each extracellular vesicle was added.

TABLE 1

| | Extracellular vesicle solution | Result |
|---|---|---|
| Comparative Example 6 | Extracellular vesicle solution (ultracentrifugal method, bone marrow-derived MSC) | FIG. 5A |
| Example 23 | Extracellular vesicle solution (PS-affinity method, bone marrow-derived MSC) | FIG. 5A |
| Example 24 | Extracellular vesicle solution (ultracentrifugal method, bone marrow-derived MSC, VEGF stimulation is applied) | FIG. 5A |
| Example 25 | Extracellular vesicle solution (PS-affinity method, bone marrow-derived MSC, VEGF stimulation is applied) | FIG. 5A |
| Example 26 | Extracellular vesicle solution (ultracentrifugal method, bone marrow-derived MSC, bFGF stimulation is applied) | FIG. 5A |
| Example 27 | Extracellular vesicle solution (PS-affinity method, bone marrow-derived MSC, bFGF stimulation is applied) | FIG. 5A |
| Example 28 | Extracellular vesicle solution (ultracentrifugal method, bone marrow-derived MSC, TGFβ1 stimulation is applied) | FIG. 5A |
| Example 29 | Extracellular vesicle solution (PS-affinity method, bone marrow-derived MSC, TGFβ1 stimulation is applied) | FIG. 5A |
| Comparative Example 7 | Extracellular vesicle solution (ultracentrifugal method, adipose-derived MSC) | FIG. 5B |
| Example 30 | Extracellular vesicle solution (PS-affinity method, adipose-derived MSC) | FIG. 5B |
| Example 31 | Extracellular vesicle solution (ultracentrifugal method, adipose-derived MSC, VEGF stimulation is applied) | FIG. 5B |
| Example 32 | Extracellular vesicle solution (PS-affinity method, adipose-derived MSC, VEGF stimulation is applied) | FIG. 5B |
| Example 33 | Extracellular vesicle solution (ultracentrifugal method, adipose-derived MSC, bFGF stimulation is applied) | FIG. 5B |
| Example 34 | Extracellular vesicle solution (PS-affinity method, adipose-derived MSC, bFGF stimulation is applied) | FIG. 5B |
| Example 35 | Extracellular vesicle solution (PS-affinity method, adipose-derived MSC, TGFβ1 stimulation is applied) | FIG. 5B |
| Comparative Example 8 | Extracellular vesicle solution (ultracentrifugal method, umbilical cord-derived MSC) | FIG. 5C |
| Example 36 | Extracellular vesicle solution (PS-affinity method, umbilical cord-derived MSC) | FIG. 5C |
| Example 37 | Extracellular vesicle solution (ultracentrifugal method, umbilical cord-derived MSC, VEGF stimulation is applied) | FIG. 5C |
| Example 38 | Extracellular vesicle solution (PS-affinity method, umbilical cord-derived MSC, VEGF stimulation is applied) | FIG. 5C |

Examples 39 to 54 and Comparative Examples 9 to 11. Evaluation of Angiogenesis Action of Extracellular Vesicle Acquired by Ultracentrifugal Method and PS-Affinity Method Cell images acquired in Examples 23 to 38 and Comparative Examples 6 to 8 were analyzed for the total tube length using an image analysis software Image J's angiogenesis analyzer to evaluate an angiogenesis action (tube formation promoting action) of HUVEC cells by the extracellular vesicles in each "extracellular vesicle solution". The "extracellular vesicle solution" used in each of Examples and Comparative Examples is illustrated in Table 2 below. The results of the obtained total tube length are illustrated in FIG. 6, individually. In FIG. 6, the vertical axis indicates a relative value for control of the total tube length, the horizontal axis indicates acquisition conditions of the extracellular vesicles used, the purification method "UC" represents the result of using extracellular vesicles purified by the ultracentrifugal method, and the purification method "PS" represents the result of using extracellular vesicles purified by the PS-affinity method. In addition, EXTRACELLULAR VESICLE (−) represents a case where no extracellular vesicles are added, extracellular vesicles "MSC" represents a case where extracellular vesicles derived from each MSC to which stimulation is not applied are used, and extracellular vesicles "MSC stimulation is applied" represents a case where MSC-derived extracellular vesicles stimulated with a growth factor are used.

TABLE 2

Figure 6A:
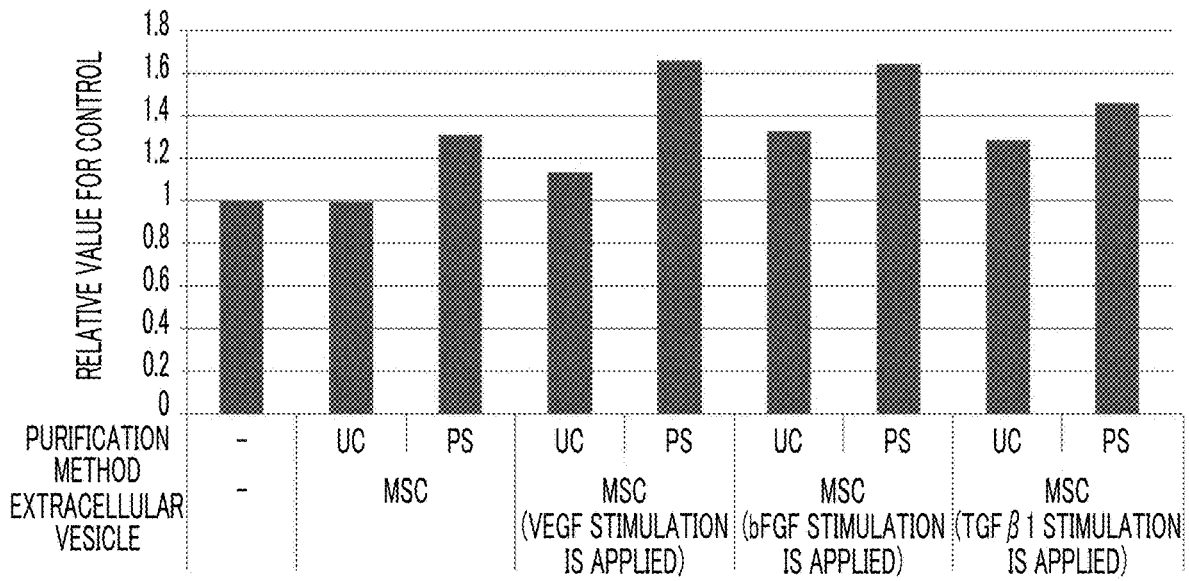
FIG. 6A is a diagram illustrating the results of evaluating an angiogenesis action of bone marrow MSC-derived extracellular vesicles based on tube formation in HUVEC cells as an index.

| | Extracellular vesicle solution | Result |
|---|---|---|
| Comparative Example 9 | Extracellular vesicle solution (ultracentrifugal method, bone marrow-derived MSC) | FIG. 6A |
| Example 39 | Extracellular vesicle solution (PS-affinity method, bone marrow-derived MSC) | FIG. 6A |
| Example 40 | Extracellular vesicle solution (ultracentrifugal method, bone marrow-derived MSC, VEGF stimulation is applied) | FIG. 6A |
| Example 41 | Extracellular vesicle solution (PS-affinity method, bone marrow-derived MSC, VEGF stimulation is applied) | FIG. 6A |
| Example 42 | Extracellular vesicle solution (ultracentrifugal method, bone marrow-derived MSC, bFGF stimulation is applied) | FIG. 6A |
| Example 43 | Extracellular vesicle solution (PS-affinity method, bone marrow-derived MSC, bFGF stimulation is applied) | FIG. 6A |
| Example 44 | Extracellular vesicle solution (ultracentrifugal method, bone marrow-derived MSC, TGFβ1 stimulation is applied) | FIG. 6A |

TABLE 2-continued

Figure 6B:
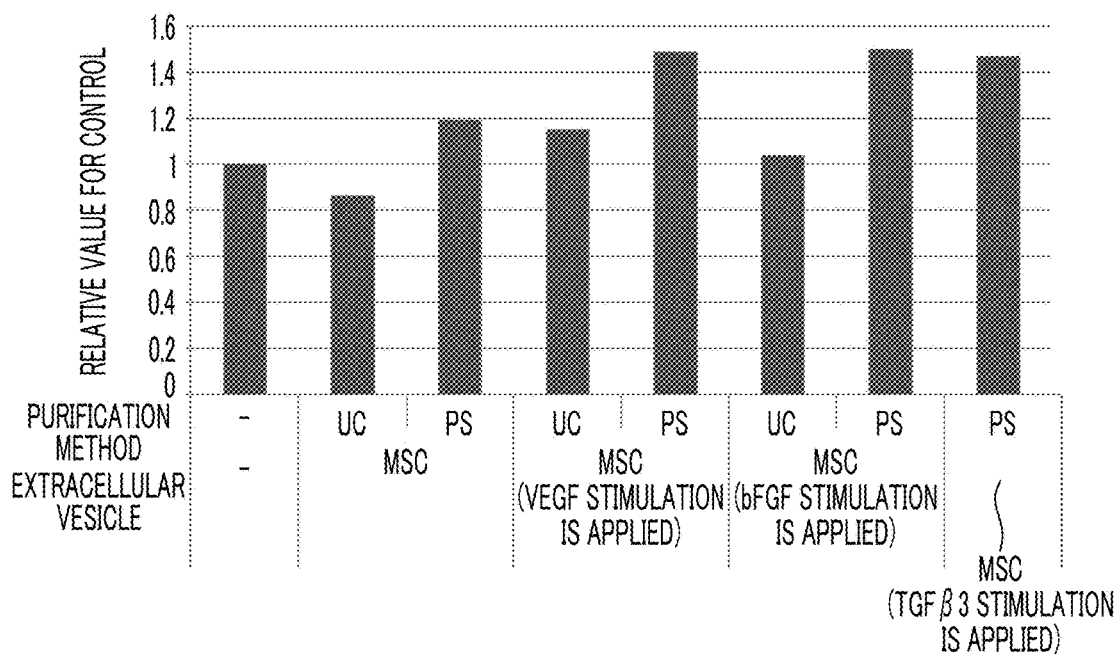
FIG. 6B is a diagram illustrating the results of evaluating an angiogenesis action of adipose MSC-derived extracellular vesicles based on tube formation in HUVEC cells as an index.
Figure 6C:
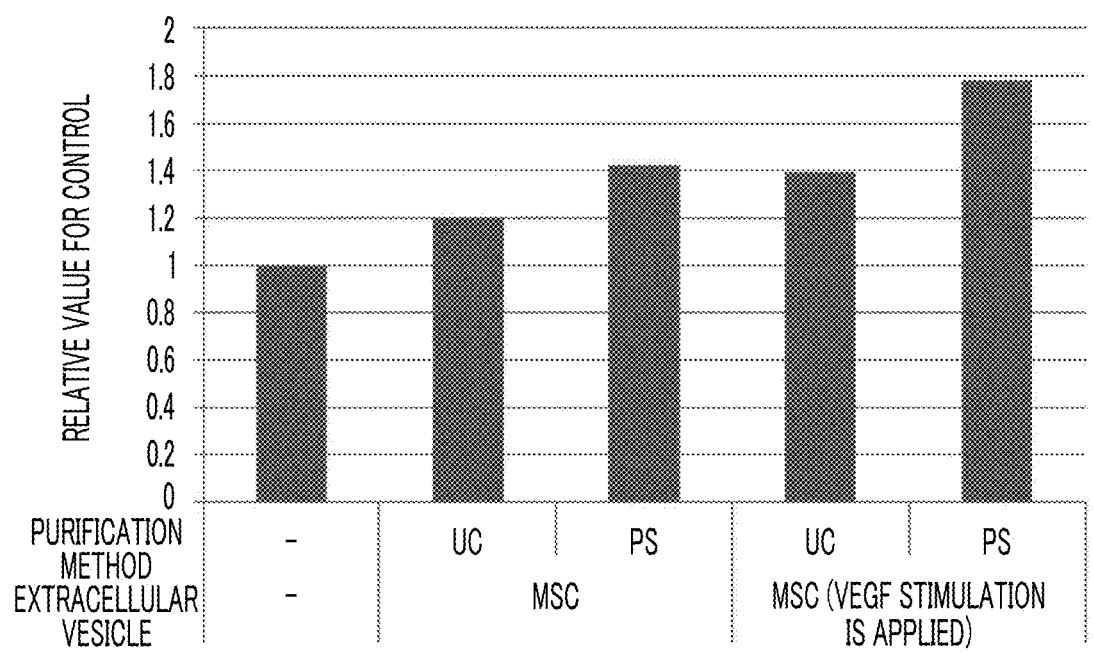
FIG. 6C is a diagram illustrating the results of evaluating an angiogenesis action of umbilical cord MSC-derived extracellular vesicles based on tube formation in HUVEC cells as an index.

| | Extracellular vesicle solution | Result |
|---|---|---|
| Example 45 | Extracellular vesicle solution (PS-affinity method, bone marrow-derived MSC, TGFβ1 stimulation is applied) | FIG. 6A |
| Comparative Example 10 | Extracellular vesicle solution (ultracentrifugal method, adipose-derived MSC) | FIG. 6B |
| Example 46 | Extracellular vesicle solution (PS-affinity method, adipose-derived MSC) | FIG. 6B |
| Example 47 | Extracellular vesicle solution (ultracentrifugal method, adipose-derived MSC, VEGF stimulation is applied) | FIG. 6B |
| Example 48 | Extracellular vesicle solution (PS-affinity method, adipose-derived MSC, VEGF stimulation is applied) | FIG. 6B |
| Example 49 | Extracellular vesicle solution (ultracentrifugal method, adipose-derived MSC, bFGF stimulation is applied) | FIG. 6B |
| Example 50 | Extracellular vesicle solution (PS-affinity method, adipose-derived MSC, bFGF stimulation is applied) | FIG. 6B |
| Example 51 | Extracellular vesicle solution (PS-affinity method, adipose-derived MSC, TGFβ1 stimulation is applied) | FIG. 6B |
| Comparative Example 11 | Extracellular vesicle solution (ultracentrifugal method, umbilical cord-derived MSC) | FIG. 6C |
| Example 52 | Extracellular vesicle solution (PS-affinity method, umbilical cord-derived MSC) | FIG. 6C |
| Example 53 | Extracellular vesicle solution (ultracentrifugal method, umbilical cord-derived MSC, VEGF stimulation is applied) | FIG. 6C |
| Example 54 | Extracellular vesicle solution (PS-affinity method, umbilical cord-derived MSC, VEGF stimulation is applied) | FIG. 6C |

It was found from FIGS. 5 and 6 that the extracellular vesicles acquired by the PS-affinity method promote tube formation that reflects angiogenesis by HUVEC cells regardless of the type of mesenchymal stem cells. It was also found that the extracellular vesicles acquired by the PS-affinity method further promote angiogenesis than the extracellular vesicles acquired by the ultracentrifugal method. In addition, it was found that the extracellular vesicles acquired from mesenchymal stem cells stimulated with VEGF, bFGF, or TGFβ, which is a growth factor, further promote angiogenesis than the extracellular vesicles acquired from mesenchymal stem cells to which stimulation is not applied. Furthermore, the extracellular vesicles acquired from the mesenchymal stem cells stimulated with VEGF, bFGF, or TGFβ, which is a growth factor, by the PS-affinity method further particularly remarkably promote angiogenesis than the extracellular vesicles acquired by another means such as extracellular vesicles acquired from the mesenchymal stem cells stimulated with VEGF by the ultracentrifugal method.

The present invention is to provide the angiogenesis agent containing an extracellular vesicle that has an angiogenesis action and that is acquired from a mesenchymal stem cell-derived extracellular vesicle, as an active ingredient. The angiogenesis agent provided in the present invention has great industrial availability in that an effective therapeutic medication for diseases in which the angiogenesis action may be involved is provided.

What is claimed is:

1. A method of producing an extracellular vesicle having an angiogenesis action, the method comprising:
a step of obtaining an extracellular vesicle from a mesenchymal stem cell-derived extracellular vesicle by a method of using a substance having an affinity for phosphatidylserine.

2. The method of producing an extracellular vesicle according to claim 1, wherein the substance having an affinity for phosphatidylserine is a Tim protein.

3. The method of producing an extracellular vesicle according to claim 2, wherein the Tim protein is selected from Tim4 protein, Tim3 protein, and Tim1 protein.

4. The method of producing an extracellular vesicle according to claim 1, the method further comprising:
a step of obtaining a mesenchymal stem cell-derived extracellular vesicle stimulated with a growth factor.

5. A method of producing an angiogenesis agent,
the method comprising a step of obtaining an extracellular vesicle from a mesenchymal stem cell-derived extracellular vesicle by a method of using a substance having an affinity for phosphatidylserine.

6. The method of producing an angiogenesis agent according to claim 5, wherein the mesenchymal stem cell is a cell derived from an iPS cell or a cell derived from one or more tissues selected from the group consisting of umbilical cord, umbilical cord blood, bone marrow, adipose, muscle, nerve, skin, amniotic membrane, and placenta.

7. The method of producing an angiogenesis agent according to claim 5, the method further comprising:
a step of obtaining a mesenchymal stem cell-derived extracellular vesicle stimulated with a growth factor.

8. The method of producing an angiogenesis agent according to claim 5, wherein the substance having an affinity for phosphatidylserine is a Tim protein.

9. The method of producing an angiogenesis agent according to claim 8, wherein the Tim protein is selected from Tim4 protein, Tim3 protein, and Tim1 protein.

* * * * *